US012638629B2

(12) United States Patent
Sadakane et al.

(10) Patent No.: US 12,638,629 B2
(45) Date of Patent: May 26, 2026

(54) HEAD-UP DISPLAY SYSTEM

(71) Applicant: AGC INC., Tokyo (JP)

(72) Inventors: Shunsuke Sadakane, Tokyo (JP);
Yusuke Nishizawa, Tokyo (JP)

(73) Assignee: AGC INC., Tokyo (JP)

( * ) Notice: Subject to any disclaimer, the term of this
patent is extended or adjusted under 35
U.S.C. 154(b) by 816 days.

(21) Appl. No.: 17/857,315

(22) Filed: Jul. 5, 2022

(65) Prior Publication Data

US 2022/0334300 A1    Oct. 20, 2022

Related U.S. Application Data

(63) Continuation of application No.
PCT/JP2021/001091, filed on Jan. 14, 2021.

(30) Foreign Application Priority Data

Jan. 15, 2020    (JP) ................................. 2020-004523

(51) Int. Cl.
*G02B 5/30*        (2006.01)
*B60K 35/22*       (2024.01)
(Continued)

(52) U.S. Cl.
CPC ............ *G02B 5/3066* (2013.01); *B60K 35/22*
(2024.01); *B60K 35/23* (2024.01); *B60K 35/28*
(2024.01);
(Continued)

(58) Field of Classification Search
CPC .............. G02B 5/3066; G02B 27/0101; G02B
2027/011; G02B 2027/012; G02B 5/3033;
(Continued)

(56) References Cited

U.S. PATENT DOCUMENTS 5,999,314 A * 12/1999 Asakura ............ B32B 17/10761
359/485.02
2004/0135742 A1* 7/2004 Weber ............... B32B 17/10036
345/7
(Continued)

FOREIGN PATENT DOCUMENTS

CN          106630688 A  *  5/2017
CN          106646874 A     5/2017
(Continued)

OTHER PUBLICATIONS

International Search Report issued Apr. 13, 2021 in PCT/JP2021/
001091 (with English translation), 6 pages.
(Continued)

*Primary Examiner* — Pinping Sun
(74) *Attorney, Agent, or Firm* — Element IP, PLC

(57) ABSTRACT

A head-up display system for vehicles, which has a light
source that emits p-polarized visible light, and laminated
glass to which the p-polarized visible light is incident from
the vehicle interior side, and which displays a virtual image
on the vehicle exterior side of the laminated glass. The
laminated glass has a p-polarized light reflecting member in
a region where the p-polarized visible light is incident, the
incident angle of the p-polarized visible light to the vehicle
interior side surface of the laminated glass is 42° to 72°, the
virtual image includes a main image observed with the
highest luminance and a subsidiary image observed with a
lower luminance than the main image, and the ratio of the
reflectance of the subsidiary image to the reflectance of the
main image is at most 30% within the entire range of the
incident angle.

19 Claims, 13 Drawing Sheets

(51) Int. Cl.

| | |
|---|---|
| *B60K 35/23* | (2024.01) |
| *B60K 35/28* | (2024.01) |
| *B60K 35/60* | (2024.01) |
| *G02B 27/01* | (2006.01) |
| *B60J 1/00* | (2006.01) |

(52) U.S. Cl.
CPC .......... *B60K 35/60* (2024.01); *G02B 27/0101* (2013.01); *B60J 1/001* (2013.01); *B60K 2360/23* (2024.01); *B60K 2360/25* (2024.01); *G02B 2027/011* (2013.01)

(58) Field of Classification Search
CPC ...... G02B 27/0006; B60J 1/001; B60K 35/00; B60K 35/23; B60K 2360/23; B60K 2360/25; B60K 2360/66; B60K 2360/785; B60K 35/22; B60K 35/28; B60K 35/60; B32B 17/10036; B32B 17/10165; B32B 17/10174; B32B 17/10458; B32B 17/10761; B32B 17/10568; B32B 17/00; B60R 11/02

See application file for complete search history.

(56) References Cited

U.S. PATENT DOCUMENTS

| | | | | |
|---|---|---|---|---|
| 2010/0314900 | A1* | 12/2010 | Labrot | G02B 27/0101 156/99 |
| 2017/0242247 | A1* | 8/2017 | Tso | G02B 27/01 |
| 2017/0343806 | A1* | 11/2017 | Anzai | B60K 35/00 |
| 2018/0149865 | A1* | 5/2018 | Arndt | G02B 27/01 |
| 2019/0072764 | A1* | 3/2019 | Lee | G02B 17/023 |
| 2019/0235243 | A1* | 8/2019 | Anzai | C03C 17/34 |
| 2019/0389460 | A1* | 12/2019 | Tokunaga | B60K 35/00 |

FOREIGN PATENT DOCUMENTS

| | | | | | |
|---|---|---|---|---|---|
| JP | 2007223883 | A | | 9/2007 | |
| JP | WO2013190959 | A1 | * | 5/2016 | ............ B60K 35/60 |
| JP | 2017105665 | A | | 6/2017 | |
| JP | 2017538141 | A | | 12/2017 | |
| JP | 2018162044 | A | | 10/2018 | |
| JP | 2019066773 | A | | 4/2019 | |
| JP | 2019164239 | A | | 9/2019 | |
| JP | 2019172512 | A | | 10/2019 | |
| JP | 2019182738 | A | | 10/2019 | |
| KR | 20100088760 | A | * | 8/2010 | ............ G02B 5/003 |
| WO | WO-2011077688 | A1 | | 6/2011 | |
| WO | WO-2013190959 | A1 | | 12/2013 | |
| WO | WO-2016133187 | A1 | | 8/2016 | |
| WO | WO-2023071170 | A1 | * | 5/2023 | |

OTHER PUBLICATIONS

English translation of the office action issued Sep. 30, 2025, in corresponding Japanese Patent Application No. 2024-209373, 10 pages.

* cited by examiner

| | Ex. 1 | Ex. 2 | Ex. 3 | Ex. 4 | Ex. 5 | Ex. 6 | Ex. 7 |
|---|---|---|---|---|---|---|---|
| Laminated glass | LG1 | LG2 | LG3 | LG4 | LG5 | LG6 | LG7 |
| Position of p-polarized light reflecting film | 3rd-surface | 3rd-surface | 3rd-surface | 4th-surface | 3rd-surface | 3rd-surface | 4th-surface |
| Wedge angle of glass plate | 0 mrad | 0 mrad | 0 mrad | 0 mrad | 0 mrad | 0.1 mrad | 0 mrad |
| Wedge angle of interlayer film | 0 mrad | 0 mrad | 0 mrad | 0 mrad | 0 mrad | 0.15 mrad | 0.25 mrad |
| Visible light reflectance of p-polarized light at 57 deg | 3% | 5% | 5% | 5% | 5% | 5% | 5% |
| Visible light reflectance of p-polarized light at 66 deg | 5% | 7% | 7% | 7% | 7% | 7% | 7% |
| Minimum R of concave mirror | 800 mm | 800 mm | 700 mm | 700 mm | 100 mm | 700 mm | 700 mm |
| HUD image distance | 2000 mm | 2000 mm | 3000 mm | 3000 mm | 20000 mm | 3000 mm | 3000 mm |
| Subsidiary image separation amount of 4th surface reflection | 0.7 mrad | 0.7 mrad | 0.6 mrad | - | 0.3 mrad | 0 mrad | - |
| Subsidiary image separation amount of 1st surface reflection | 1.8 mrad | 1.8 mrad | 1.4 mrad | 2.0 mrad | 0.7 mrad | 0 mrad | 0 mrad |
| Judgement of subsidiary image separation amount | ○ | ○ | ◎ | ○ | ☆ | ☆ | ☆ |
| Subsidiary image reflectance/main image reflectance at 66 deg | 41% | 30% | 30% | 30% | 30% | 30% | 30% |
| Judgement of subsidiary image reflectance/main image reflectance | × | ○ | ○ | ○ | ○ | ○ | ○ |

Fig. 14

| | | Geometrical thickness (nm) | Refractive index at 550 nm | Tv (illA) | Tv (illD65, 2°) | Rout | | | | | | |
|---|---|---|---|---|---|---|---|---|---|---|---|---|
| | | | | | | | Incident angle 8° | | | Incident angle 55° | | Incident angle 35° |
| | | | | | | Rv (out) | a*_Rout | b*_Rout | a*_R55 | b*_R55 | a*_R35 | b*_R35 |
| Comp. Ex. 1 | TiO₂/SiO₂ | 73.2/99.5 | 2.35/1.46 | 87.0 | 86.7 | 10.9 | -2.12 | -10.06 | 6.37 | -1.51 | 2.87 | -8.34 |
| Ex. 8-1 | TZO/SiO₂ | 73.9/99.5 | 2.33/1.46 | 87.2 | 86.9 | 10.6 | -2.68 | -10.08 | 6.16 | -1.84 | 2.45 | -8.57 |
| Ex. 8-2 | SiZrN/SiO₂ | 78.0/99.5 | 2.21/1.46 | 87.1 | 86.7 | 8.5 | -1.58 | -11.98 | 6.62 | -2.71 | 3.55 | -10.20 |
| Ex. 8-3 | ZSO5/SiO₂ | 85.3/99.5 | 2.02/1.46 | 91.5 | 91.2 | 6.2 | -1.28 | -14.28 | 6.49 | -4.07 | 4.04 | -12.57 |

Fig. 15

| | | Geometrical thickness (nm) | Refractive index at 550 nm | Rin | | | | | | | | |
| | | | | | Incident angle 55° | | | | | Incident angle 172° | | |
| | | | | Rv (in) | Rp_pol | a*_Rin | b*_Rin | a*_Rp_pol | b*_Rp_pol | R172(in) | a*_R172 | b*_R172 |
| Comp. Ex. 1 | TiO₂/SiO₂ | 73.2/99.5 | 2.35/1.46 | 15.2 | 10.2 | 7.11 | -1.64 | -2.24 | 11.50 | 11.0 | -1.69 | -10.73 |
| Ex. 8-1 | TZO/SiO₂ | 73.9/99.5 | 2.33/1.46 | 14.9 | 9.9 | 6.87 | -1.98 | -2.73 | 11.62 | 10.7 | -2.31 | -10.74 |
| Ex. 8-2 | SiZrN/SiO₂ | 78.0/99.5 | 2.21/1.46 | 12.3 | 7.3 | 7.43 | -3.44 | -1.90 | 9.56 | 8.3 | -1.73 | -13.23 |
| Ex. 8-3 | ZSO5/SiO₂ | 85.3/99.5 | 2.02/1.46 | 10.5 | 4.3 | 6.83 | -3.96 | -1.41 | 7.07 | 6.2 | -1.24 | -15.18 |

Fig. 16

| | Geometrical thickness (nm) | Tv (illA) | Tv (illD65, 2°) | Rv (out) | Rout | | Incident angle 55° | | Incident angle 35° | |
| | | | | | Incident angle 8° | | | | | |
| | | | | | a*_Rout | b*_Rout | a*_R55 | b*_R55 | a*_R35 | b*_R35 |
| Ex. 8-4 | TZO/TSO/ SiO₂ | 39.5/32.5/ 117.5 | 83.29 | 82.05 | 14.37 | -10.54 | -12.38 | -0.12 | -14.03 | -6.33 | -16.21 |
| Ex. 8-5 | TSO/SiO₂/ TZO/SiO₂ | 6.0/171.1/ 63.9/116.9 | 81.28 | 80.45 | 16.40 | -7.71 | -7.51 | 0.29 | -8.81 | -5.69 | -8.83 |

Fig. 17

| | Geometrical thickness (nm) | Rv (in) | Rin | | Incident angle 55° | | | Incident angle 172° | |
| | | | Incident angle 55° | | | | | | |
| | | | Rp_pol | a*_Rin | b*_Rin | a*_Rp_pol | b*_Rp_pol | R172(in) | a*_R172 | b*_R172 |
| Ex. 8-4 | TZO/TSO/ SiO₂ | 39.5/32.5/ 117.5 | 13.69 | 9.03 | 0.62 | -15.28 | -2.96 | 5.29 | 14.62 | -10.09 | -13.31 |
| Ex. 8-5 | TSO/SiO₂/ TZO/SiO₂ | 6.0/171.1/ 63.9/116.9 | 17.87 | 13.15 | 1.26 | -9.79 | -5.30 | 9.23 | 16.75 | -6.99 | -8.47 |

HEAD-UP DISPLAY SYSTEM

TECHNICAL FIELD

The present invention relates to a head-up display system.

BACKGROUND ART

In recent years, there has been a growing trend toward the introduction of a head-up display (HUD), which reflects an image on the windshield of a vehicle and displays a predetermined information in the driver's field of vision. One of the challenges in HUD is to improve the visibility of the HUD image, and for that purpose, an attempt has been made to reduce the double and triple images.

As an example, a technology to project a HUD image clearly mainly by only reflection of a p-polarized light reflecting member while suppressing double and triple images by providing a p-polarized light reflecting member consisting of a coating or film that reflects p-polarized light to laminated glass and letting p-polarized light enter into the laminated glass, may be mentioned.

PRIOR ART DOCUMENT

Patent Document

Patent Document 1: JP-A-2017-538141

DISCLOSURE OF INVENTION

Technical Problem

However, if the angle of incidence at the time of letting p-polarized light enter into the laminated glass is out of a certain range, the reflection on the vehicle exterior side and interior side surfaces of the laminated glass increases, whereby a subsidiary image such as a double or triple image becomes distinct, and the visibility of the HUD image will be lowered.

The present invention has been made in consideration of the above point, and has an object to improve the visibility of a HUD image in a head-up display system for vehicles, in which p-polarized visible light is incident to laminated glass from the vehicle interior side.

Solution to Problem

The present head-up display system is a head-up display system for vehicles, which has a light source that emits p-polarized visible light and laminated glass to which the p-polarized visible light is incident from the vehicle interior side, and which displays a virtual image on the vehicle exterior side of laminated glass, wherein the laminated glass is provided with a p-polarized light reflecting member at least in the region where the p-polarized visible light is incident, the angle of incidence of the p-polarized visible light to the vehicle interior side surface of the laminated glass is at least 42 deg and at most 72 deg, the laminated glass has a reflectance of the p-polarized visible light of at least 5% at an angle of incidence of the p-polarized visible light being 57 deg, the virtual image includes a main image which is observed with the highest luminance, and a subsidiary image which is observed with a lower luminance than the main image, among images that appear separated when the p-polarized visible light is incident to the laminated glass, and the ratio of the reflectance of the subsidiary image to the reflectance of the main image is at most 30% within the entire range of the angle of incidence of the p-polarized visible light.

Advantageous Effect of Invention

According to the disclosed one embodiment, it is possible to improve the visibility of a HUD image in a head-up display system for vehicles in which p-polarized visible light is incident to the laminated glass from the vehicle interior side.

BRIEF DESCRIPTION OF DRAWINGS

FIG. 13 is a table explaining Ex. 1 to Ex. 7.

FIG. 14 is a table explaining the optical parameters in Ex. 8-1 to Ex. 8-3 and Comparative Example 1.

FIG. 15 is a table explaining other optical parameters in Ex. 8-1 to Ex. 8-3 and Comparative Example 1.

FIG. 16 is a table explaining the optical parameters in Ex. 8-4 and Ex. 8-5.

FIG. 17 is a table explaining other optical parameters in Ex. 8-4 and Ex. 8-5.

DESCRIPTION OF EMBODIMENTS

In the following, embodiments for implementing the invention will be described with reference to the drawings. In each drawing, the same symbol is attached to the same constituent part, whereby duplicate explanation may be omitted. Further, in each drawing, the size and shape may be partially exaggerated to make it easier to understand the content of the present invention.

A "vehicle" refers to any moving object having laminated glass, including a train, a ship, an aircraft, etc., although it is typically an automobile.

Further, a plan view is meant for viewing the predetermined region of laminated glass from the direction normal to the vehicle interior side surface of the laminated glass, and a plan shape refers to the shape of a predetermined region of laminated glass as viewed from the direction normal to the vehicle interior side surface of the laminated glass.

First Embodiment

[HUD System]

Figure 1:
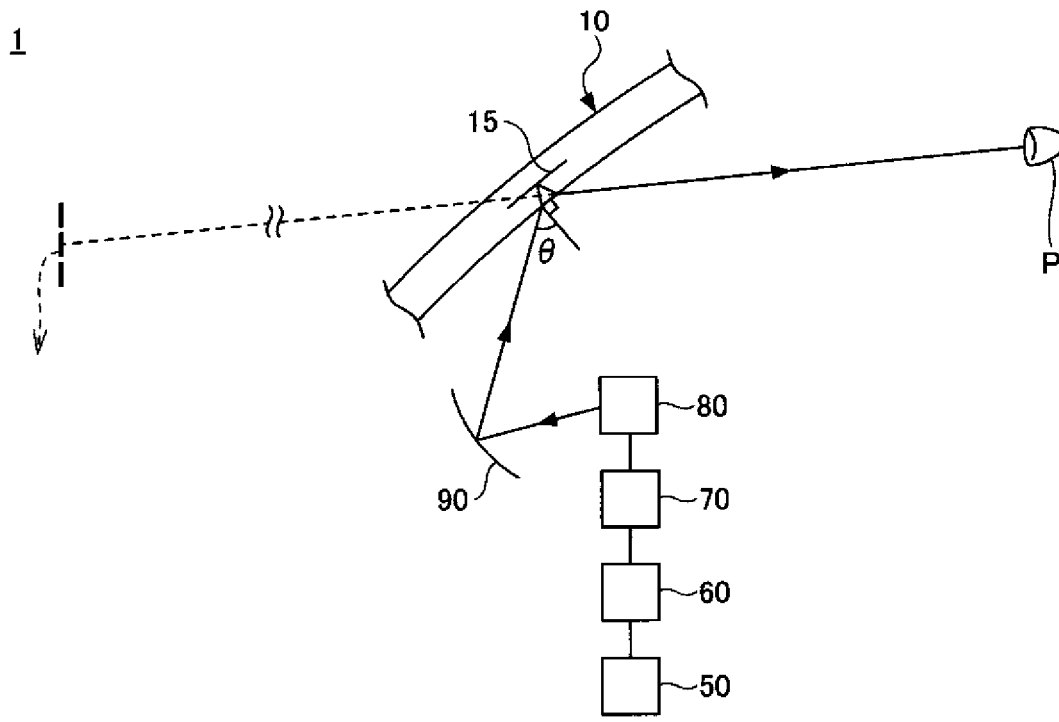
FIG. 1 is a schematic diagram illustrating the HUD system according to the first embodiment of the present invention.

FIG. 1 is a schematic diagram illustrating the HUD system according to the first embodiment. The HUD system 1 shown in FIG. 1 has a laminated glass 10, a light source 50, a first optical system 60, an image display element 70, a second optical system 80 and a concave mirror 90. The HUD system 1 is a head-up display system for vehicles, that displays a virtual image on the vehicle exterior side of the laminated glass 10. Here, in the HUD system 1, the first optical system 60 and the second optical system 80 may be installed as the case requires.

Laminated glass 10 is, for example, a windshield for a vehicle, in which p-polarized visible light is incident from the vehicle interior side. The laminated glass 10 is equipped with a p-polarized light reflecting film 15, which is a type of p-polarized light reflecting member, in the region where p-polarized visible light is incident.

The light source 50 is a light source that emits p-polarized visible light, such as a light emitting diode or laser. The light source 50 may include optical components such as polarizers and lenses that convert s-polarized light to p-polarized light. The light source 50 is, for example, composed of three light sources, i.e. a red light source, a green light source, and a blue light source.

The first optical system 60 consists of, for example, prisms, lenses, etc. that synthesize light emitted from a plurality of light sources. The image display element 70 is an element that generates an intermediate image and is, for example, a liquid crystal display element or an organic light emitting element. The second optical system 80 consists of, for example, lenses, reflective mirrors, etc. The concave mirror 90 is an optical component that reflects the intermediate image at a reflective surface having a predetermined curvature, and is disposed at a position closest to the laminated glass among optical components disposed on the optical path between the light source 50 and the laminated glass 10.

In the HUD system 1, the light emitted from the light source 50 goes through the first optical system 60 and reaches the image display element 70, whereby an intermediate image is formed on the image display element 70. The intermediate image formed on the image display element 70 is enlarged by passing through the second optical system 80 and concave mirror 90, and projected onto the laminated glass 10. The intermediate image projected on the laminated glass 10 is mainly reflected by the p-polarized light reflecting film 15 of the laminated glass 10 and is guided to the passenger's viewpoint P, whereby the passenger recognizes the intermediate image as a virtual image V (HUD image) in front of the laminated glass 10. The passenger is, for example, the driver of the vehicle.

So long as the HUD system 1 has at least the laminated glass 10, the light source 50 and the concave mirror 90, other constructions may be optional. The HUD system 1 may be, for example, a laser scanning system in which a laser beam is scanned by an optical scanning unit consisting of MEMS (Micro Electro Mechanical Systems).

[Laminated Glass]

Figure 2A:
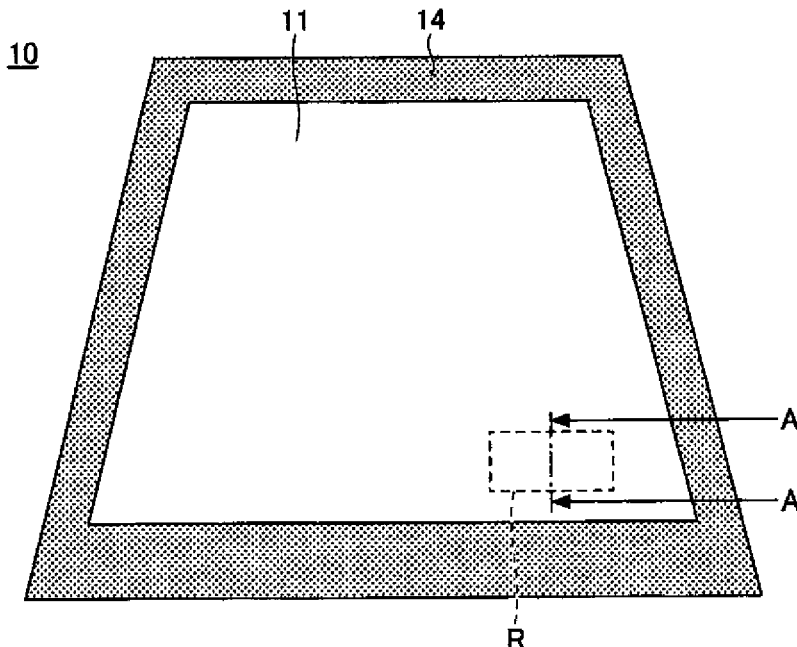
FIG. 2A is a plan view illustrating the laminated glass according to the first embodiment.
Figure 2B:
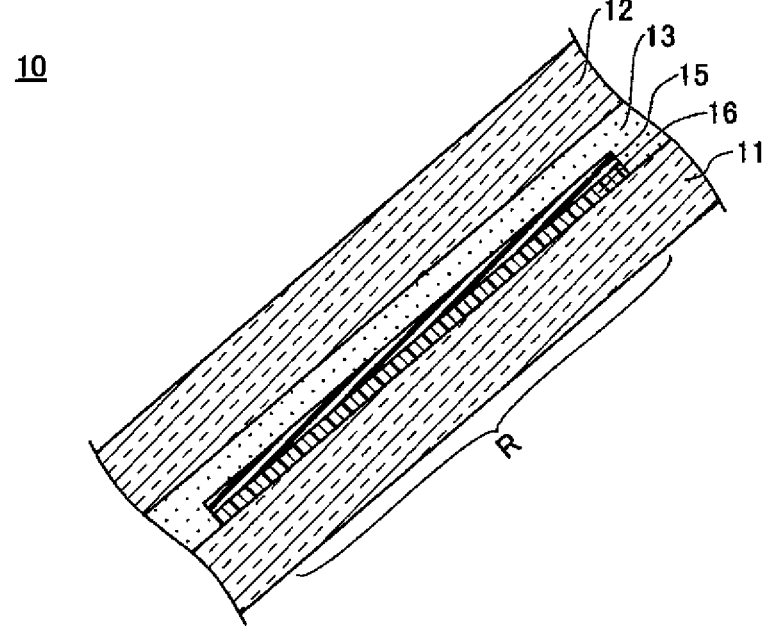
FIG. 2B is a partially enlarged cross-sectional view along A-A line in FIG. 2A.

FIGS. 2A and B are diagrams exemplifying the laminated glass of the first embodiment. FIG. 2A is a plan view schematically illustrating a state where the laminated glass is visually observed from the vehicle interior side to the vehicle exterior side, and FIG. 2B is a partially enlarged cross-sectional view along A-A line of FIG. 2A.

As shown in FIGS. 2A and B, laminated glass 10 is laminated glass for vehicles, which has a glass plate (vehicle interior side) 11, a glass plate (vehicle exterior side) 12, an interlayer film 13, a shielding layer 14, a p-polarized light reflecting film 15 and an adhesive layer 16.

Laminated glass 10 is, for example, a double curved shape that is curved in both the vertical and horizontal directions when installed in a vehicle, but it may also be a single curved shape that is curved only in the vertical direction or only in the horizontal direction. In a case where the laminated glass 10 is curved, it is preferred that it is curved so that it is convex toward the vehicle exterior side.

In a case where the laminated glass 10 is curved, the radius of curvature is preferably at least 1,000 mm and at most 100,000 mm. The radii of curvature of the glass plate 11 and the glass plate 12 may be the same or may be different. In a case where the radii of curvature of the glass plate 11 and the glass plate 12 are different, the radius of curvature of the glass plate 11 is smaller than the radius of curvature of the glass plate 12.

The glass plate 11 and the glass plate 12 are a pair of glass plates facing each other, and the interlayer film 13, the p-polarized light reflecting film 15 and the adhesive layer 16 are located between the pair of glass plates. The glass plate 11 and the glass plate 12 are fixed in a state of sandwiching the interlayer film 13, the p-polarized light reflecting film 15 and the adhesive layer 16.

The interlayer film 13 is the film that bonds the glass plate 11 and the glass plate 12. The periphery of the interlayer film 13 is preferably edge-treated. That is, the edge of the interlayer film 13 is preferably treated so that it does not protrude too much from the edges of the glass plates 11 and 12. When the amount of protrusion of the edge of the interlayer film 13 from the edges of the glass plates 11 and 12 is at most 150 μm, it is suitable in that it does not damage the appearance.

The shielding layer 14 is an opaque layer and may be provided, for example, in a band shape along the periphery of the laminated glass 10. The shielding layer 14 is, for example, an opaque (e.g. black) colored ceramic layer. The shielding layer 14 may be a light-blocking colored interlayer or colored film, or a combination of a colored interlayer and a colored ceramic layer. The colored film may be integrated with an infrared reflecting film or the like.

By the presence of the opaque shielding layer 14 in the laminated glass 10, it is possible to prevent the adhesive made of a resin such as urethane that holds the periphery of the laminated glass 10 to the car body, from deterioration due to ultraviolet rays.

The shielding layer 14 can be formed, for example, by applying a ceramic color paste containing a fusible glass frit containing a black pigment on a glass plate by screen printing or the like and firing it, but is not limited to such a method. The shielding layer 14 may be formed, for example, by applying an organic ink containing a black or dark pigment on a glass plate by screen printing or the like and drying it.

In the laminated glass 10, the region surrounded by the shielding layer 14 in plan view is the transparent region, and in the transparent region, a HUD display region R (the region indicated by the dotted line) is defined for use in the HUD. Here, the HUD display region R is not limited to a single location, and, for example, it may be disposed as divided into multiple locations in the vertical direction or may be disposed as divided into multiple locations in the horizontal direction, in the transparent region.

The HUD display region R is a display region that displays information by reflecting a projected image from the vehicle interior side. The HUD display region R is a range where in an eye box based on SAE J1757-2 (2018), at the time when a concave mirror 90 disposed inside the car is rotated, or the HUD display position is moved by the first optical system 60 or the second optical system 80, the light from the concave mirror 90 irradiates the laminated glass 10. Further, in this specification, the transparent region refers to the region of test region C defined in JIS R3211.

The HUD display region R is located, for example, at a lower place of the laminated glass 10. A p-polarized light reflecting film 15 is disposed in the HUD display region R and its neighboring region. In this embodiment, the p-polarized light reflecting film 15 is attached to the vehicle exterior side surface of the glass plate 11 via an adhesive layer 16. The p-polarized light reflecting film 15 may be disposed, for example, so that it includes the entire HUD display region R and its outer periphery overlaps the shielding layer 14.

The p-polarized light reflecting film 15 is a film that reflects p-polarized visible light incident from the concave mirror 90 towards the vehicle interior side. The p-polarized light reflecting film 15 is transparent to visible light. As the p-polarized light reflecting film 15, it is possible to employ, for example, a film or the like containing a birefringent interference type polarizer composed of a polymer multilayer film consisting of two or more polymers different in the refractive index, a polarizer having microscopic asperities so-called a wire grid type, or a polarizer composed of a cholesteric liquid crystal layer.

The thickness of the p-polarized light reflecting film 15 is preferably at least 25 μm and at most 200 μm. The thickness of the p-polarized light reflecting film 15 is preferably made to be at most 150 μm, more preferably made to be at most 100 μm. By making the thickness of the p-polarized light reflecting film 15 to be at most 200 μm, degassing properties at the time of preparing the laminated glass will be good; by making it to be at most 150 μm, the degassing properties will be better, and by making it to be at most 100 μm, the degassing properties will be particularly good. By making the thickness of the p-polarized light reflecting film 15 to be at least 25 μm, the workability at the time of preparing the laminated glass will be good.

The mounting position of the p-polarized light reflecting film 15 is preferably the vehicle exterior side surface of the glass plate 11 in FIG. 2B from the viewpoint of the reflection efficiency. In the following description, 4th surface is the vehicle interior side surface of the glass plate 11, 3rd surface is the vehicle exterior side surface of the glass plate 11, 2nd surface is the vehicle interior side surface of the glass plate 12, and 1st surface is the vehicle exterior side surface of the glass plate 12.

The material for the adhesive layer 16 is not particularly limited so long as it has the function to fix the p-polarized light reflecting film 15, but, for example, it may be a material of acrylic, acrylate, urethane, urethane acrylate, epoxy, epoxy acrylate, polyolefin, modified olefin, polypropylene, ethylene vinyl alcohol, vinyl chloride, chloroprene rubber, cyanoacrylate, polyamide, polyimide, polystyrene or polyvinyl butyral-type. The material for the adhesive layer 16 is transparent to visible light.

The thickness of the adhesive layer 16 is preferably at least 0.2 μm and at most 70 μm. By making the thickness of the adhesive layer 16 to be at least 0.2 μm, the adhesive layer 16 will mitigate the difference in thermal shrinkage between the glass plate 11 and the p-polarized light reflecting film 15. As a result, the smoothness of the vehicle interior side and vehicle exterior side surfaces of the p-polarized light reflecting film 15 will be maintained, and it is possible to reduce the distortion of the HUD image. Further, by making the thickness of the adhesive layer 16 to be at least 0.2 μm, it is possible to suppress the edge degradation of the adhesive layer 16 at the time when the laminated glass is repeatedly placed in a high temperature and high humidity environment.

Further, by making the thickness of the adhesive layer 16 to be at most 70 μm, the vehicle interior side and vehicle exterior side surfaces of the p-polarized light reflecting film 15 will follow the vehicle exterior side smooth surface of the glass plate 11, whereby the smoothness of the vehicle interior side and vehicle exterior side surfaces of the p-polarized light reflecting film 15 will be maintained, and it will be possible to reduce the distortion of the HUD image. In particular, in a construction where the image magnified by a concave mirror 90 is further magnified and reflected by the curved laminated glass 10, a slight undulation of the vehicle interior side and vehicle exterior side surfaces of the p-polarized light reflecting film 15 will cause a large distortion of the HUD image. Therefore, it is extremely important to improve the smoothness of the vehicle interior side and vehicle exterior side surfaces of the p-polarized light reflecting film 15. By making the thickness of the adhesive layer 16 to be at most 70 μm, it is possible to reduce the distortion of the HUD image even when the image magnified by the concave mirror 90 is further magnified and reflected by the curved laminated glass.

In a case where the FOV (Field Of View) of the HUD image is at least 4 deg×1 deg, the HUD image larger than before will be projected onto the laminated glass 10, whereby the p-polarized light reflecting film 15 tends to be wavy. Therefore, it becomes significant to control the thickness of the adhesive layer 16 to reduce the distortion of the HUD image. As the FOV of the HUD image becomes to be at least 5 deg×1.5 deg, at least 6 deg×2 deg, and at least 7 deg×3 deg, a still larger HUD image than before tends to be projected onto the laminated glass 10 where by the distortion of the HUD image caused by the undulation of the p-polarized light reflecting film 15 becomes to be more noticeable. Therefore, it becomes more significant to control the thickness of the adhesive layer 16 to reduce the distortion of the HUD image.

In the HUD display region R of the laminated glass 10 in such a state as installed in a vehicle, the curvature in the horizontal direction preferably has a radius of at least 1,000 mm and at most 100,000 mm. Further, In the HUD display region R of the laminated glass 10 in such a state as installed in a vehicle, the curvature in the vertical direction preferably has a radius of at least 4,000 mm and at most 20,000 mm, more preferably has a radius of at least 6,000 mm and at most 20,000 mm. When the curvatures in the vertical and horizontal directions are within the above ranges, it is possible to reduce a distortion of the HUD image projected on the p-polarized light reflecting film 15. If the radii are small, the film tends to wrinkle.

In the HUD system 1, the angle of the concave mirror 90, etc. are adjusted so that the angle of incidence θ (see FIG. 1) of the p-polarized visible light incident on the vehicle interior side surface of the laminated glass 10 becomes to be 57 deg (Brewster's angle) in the region where the p-polarized light reflecting film 15 is disposed.

Figure 3A:
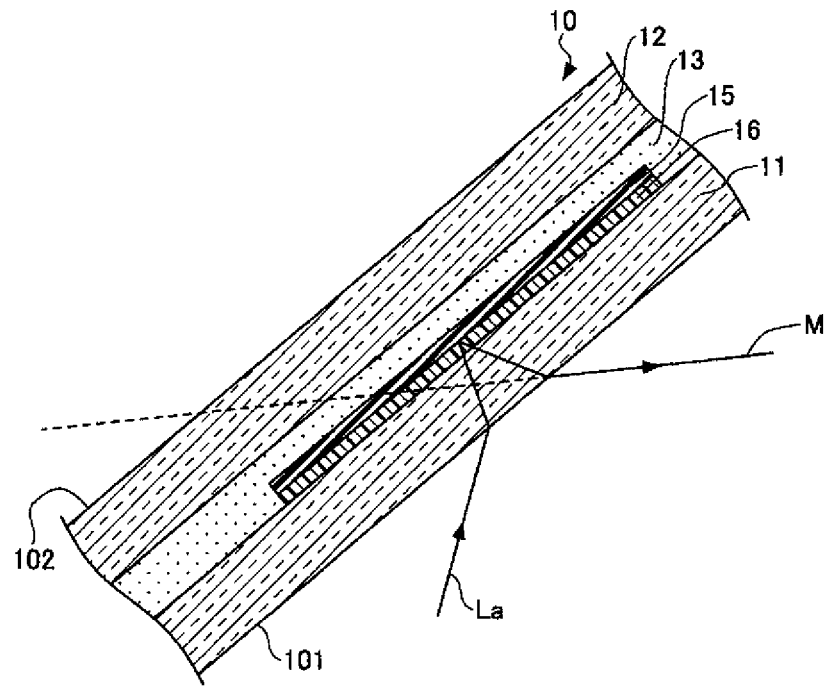
FIG. 3A is a partially enlarged cross-sectional view of laminated glass explaining the subsidiary image (Part 1).

In the case where the angle of incidence θ is 57 deg, as shown in FIG. 3A, the p-polarized visible light La incident to the vehicle interior side surface 101 of the laminated glass 10 (vehicle interior side surface of the glass plate 11) from the concave mirror 90 becomes to be only the main image reflected light M reflected by the p-polarized light reflecting film 15.

Figure 3B:
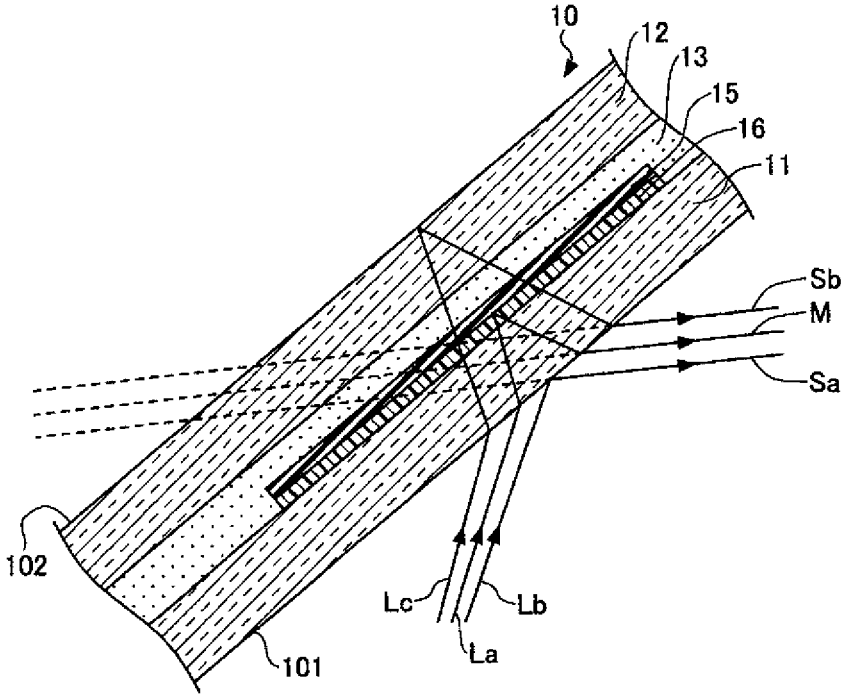
FIG. 3B is a partially enlarged cross-sectional view of laminated glass explaining the subsidiary image, and illustrating a case where the angle of incidence is shifted from the case shown in FIG. 3A.

However, if the angle of incidence θ shifts from 57 deg, as shown in FIG. 3B, the p-polarized visible light incident from the concave mirror 90 to the vehicle interior side surface 101 of the laminated glass 10 will be reflected at three portions i.e. at the p-polarized light reflecting film 15, the vehicle interior side surface 101 of the laminated glass 10, and the vehicle exterior side surface 102 of the laminated glass 10 (the vehicle exterior side surface of the glass plate 12). In FIG. 3B, the main image reflected light M is the light where light La from the concave mirror is reflected by the p-polarized light reflecting film 15. Further, the first subsidiary image reflected light Sa is the light where light Lb from the concave mirror is reflected by the vehicle interior side surface of the laminated glass 10, and the second reflected light Sb is the light where light Lc from the concave mirror is reflected by the vehicle exterior side surface 102 of the laminated glass 10. Therefore, there may be a case where virtual images appear to be separated at the time when p-polarized visible light is incident to the laminated glass 10. Among the images that appear to be separated (double images in the case of separation into two, and triple images in the case of separation into three), the image observed with the highest luminance is the main image, and the image observed with a lower luminance than the main image is the subsidiary image. The subsidiary image when the virtual image is separated into two is called double images, and the subsidiary image when the virtual image is separated into three is called triple images.

In practice, the incident angle θ may sometimes deviate from 57 deg by the curvature shape of the laminated glass 10, the position of the concave mirror 90, etc., but, in this embodiment, the range of the incident angle θ is kept to be at least 42 deg and at most 72 deg (57 deg±15 deg). In such a case, the state will be as shown in FIG. 3B and therefore, triple images will appear. However, in this embodiment, the subsidiary image reflectance/main image reflectance (the ratio of the subsidiary image reflectance to the main image reflectance) is set to at most 30%, so that the triple images are not noticeable.

In FIG. 3B, the light reflected by the p-polarized light reflecting film 15 is the main image reflected light M, the light reflected by the vehicle interior side surface 101 of the laminated glass 10 is the first subsidiary image reflected light Sa, and the light reflected by the vehicle exterior side surface 102 of the laminated glass 10 is the second subsidiary image reflected light Sb. In this case, the subsidiary image reflectance/main image reflectance means the intensity of the first subsidiary image reflected light Sa to visible light Lb/the intensity of the main image reflected light M to visible light La, and intensity of the second subsidiary image reflected light Sb to visible light Lc/the intensity of the main image reflected light M to visible light La.

$$\text{Subsidiary image reflectance/Main image reflectance} = (Sa/Lb)/(M/La)$$

$$\text{Subsidiary image reflectance/Main image reflectance} = (Sb/Lc)/(M/La)$$

Since it is difficult to directly measure the intensity of the first subsidiary image reflected light Sa to visible light Lb/the intensity of the main image reflected light M to visible light La, and the intensity of the second subsidiary image reflected light Sb to visible light Lc/the intensity of the main image reflected light M to visible light La, in this embodiment, the subsidiary image reflectance/main image reflectance is measured as the ratio of the subsidiary image luminance to the main image luminance.

That is, the subsidiary image reflectance/main image reflectance is the ratio of the subsidiary image luminance to the main image luminance at the time when the main image luminance (i.e. the luminance of the image reflected by the main reflective surface) and the subsidiary image luminance are, respectively, measured by a luminance meter at the time when p-polarized light is incident to the laminated glass 10 from the vehicle interior side. The luminance is measured in accordance with SAE J1757-2 (2018). Here, the main reflective surface is the surface on which the image observed with the highest luminance is reflected among multiple images observed at the time when p-polarized light is incident to the laminated glass 10 from the vehicle interior side, and in this embodiment, it is the surface on the vehicle interior side of the p-polarized light reflecting film 15.

In order to make the triple image further less noticeable, the range of the incident angle θ is preferably at least 47 deg and at most 67 deg (57 deg±10 deg), more preferably at least 52 deg and at most 62 deg (57 deg±5 deg).

Further, the subsidiary image reflectance/main image reflectance is more preferably at most 25%, further preferably at most 20%, still more preferably at most 15%, further more preferably at most 10%, still further preferably at most 7%, particularly preferably at most 5%. The smaller the subsidiary image reflectance/main image reflectance is, the higher the luminance of the main image becomes, thus the triple image becomes further less noticeable.

In the laminated glass 10, the visible light reflectance of p-polarized light at the time when the incident angle θ is 57 deg, is at least 5%. When the visible light reflectance of p-polarized light at the time when the incident angle θ is 57 deg is at least 5%, the main image becomes to be sufficiently bright, whereby the visibility of the HUD image will be improved.

The visible light reflectance of p-polarized light at the time when the incident angle θ is 57 deg, is preferably at least 10%, more preferably at least 12%, further preferably at least 15%. The higher the visible light reflectance of the p-polarized light at the time when the incident angle θ is 57 deg is, the higher the luminance of the main image becomes, and thus the visibility of the HUD image will be further improved.

In the p-polarized light reflecting film 15, the visible light reflectance of p-polarized light at the time when the incident angle θ is 57 deg, is preferably at most 25%, more preferably at most 20%. When the visible light reflectance of p-polarized light at the time when the incident angle θ is 57 deg, is at most 25%, it is possible to suppress the reflection of an interior material such as an instrument panel of a vehicle, and when it is at most 20%, it is possible to further suppress the reflection.

Here, the visible light reflectance of p-polarized light is one obtained by measuring the spectral reflectance described in JIS R3106 using p-polarized light at visible wavelength as the incident light at a specified incident angle, and calculating based thereon in accordance with the calculation method for visible light reflectance described in JIS R3106.

Now, the glass plate 11, the glass plate 12 and the interlayer film 13 will be described in detail.

[Glass Plates]

The glass plates 11 and 12 may be inorganic or organic glass. As inorganic glass, for example, soda-lime glass, aluminosilicate glass, borosilicate glass, alkali-free glass, quartz glass, or the like may be used without any particular restrictions. The glass plate 12 located on the outside of the laminated glass 10, is preferably an inorganic glass from the viewpoint of scratch resistance, and is preferably a soda-lime glass from the viewpoint of moldability. In a case where the glass plate 11 and the glass plate 12 are soda-lime glass, it is possible to suitably use clear glass, green glass containing at least a predetermined amount of an iron component, or UV-cut green glass.

The inorganic glass may be either non-tempered glass or tempered glass. Non-tempered glass is one obtained by forming molten glass into a plate-shape, followed by annealing. Tempered glass is one having a compressive stress layer formed on the surface of non-tempered glass.

The tempered glass may be either a physically tempered glass such as air-cooled tempered glass or a chemically tempered glass. In the case of a physically tempered glass, it is possible to temper the glass surface, for example, by letting a compressive stress layer form on the glass surface by the temperature difference between the glass surface and the glass internal by an operation other than annealing, such as quenching a uniformly heated glass plate from a temperature near the softening point in bending molding.

In the case of chemically tempered glass, it is possible to temper the glass surface, for example, by letting a compressive stress form on the glass surface by e.g. an ion exchange method after bending molding. Further, it is possible to use glass that absorbs ultraviolet or infrared rays. Further, although it is preferred to use transparent glass, a glass sheet that is colored to such an extent that transparency is not impaired, may be used.

On the other hand, as a material for an organic glass, a transparent resin, such as a polycarbonate, an acrylic resin such as polymethyl methacrylate, polyvinyl chloride, polystyrene, or the like, may be mentioned.

The shape of the glass plates 11 and 12 is not limited to a rectangular shape, but may be processed into various shapes and curvatures. For bending molding of the glass plates 11 and 12, gravity molding, press molding, roller molding, etc. may be used. The forming method of the glass plates 11 and 12 is not limited, but, for example, in the case of inorganic glass, a glass plate formed by the float method, etc. is preferred.

The thickness of the glass plate 12 is preferably such that the thinnest part is at least 1.1 mm and at most 3 mm. When the thickness of the glass plate 12 is at least 1.1 mm, the strength to resist flying rocks, etc. will be sufficient, and when the thickness is at most 3 mm, the mass of the laminated glass 10 will not be too large, such being preferred from the viewpoint of vehicle fuel efficiency. The thickness of the glass plate 12 is such that the thinnest part is more preferably at least 1.8 mm and at most 2.8 mm, further preferably at least 1.8 mm and at most 2.6 mm, still more preferably at least 1.8 mm and at most 2.2 mm, further more preferably at least 1.8 mm and at most 2.0 mm. The thinner the glass plate 12 is, the smaller the separation between the main image and the subsidiary image becomes, and thus the double or triple image becomes further less noticeable.

The thickness of the glass plate 11 is preferably at least 0.3 mm and at most 2.3 mm. When the thickness of the glass plate 11 is at least 0.3 mm, working efficiency will be good, and when the thickness is at most 2.3 mm, the mass will not become too large. Further, the thickness of the glass plate 11 is more preferably at most 1.8 mm, further preferably at most 1.6 mm, still further preferably at most 1.3 mm, still further preferably at most 1.0 mm, still further preferably at most 0.7 mm, particularly preferably at most 0.5 mm. The thinner the glass plate 11 is, the smaller the separation between the main image and the subsidiary image becomes, and thus the double or triple image becomes further less noticeable.

The glass plates 11 and 12 may be flat or curved. However, in a case where the glass plates 11 and 12 are curved and the thickness of the glass plate 11 is not appropriate, if as the glass plates 11 and 12, two plates of particularly deeply bent glass are molded, mismatch will be caused between the two plate shapes, which will greatly affect the glass quality such as the residual stress after pressing.

However, by making the thickness of the glass plate 11 to be at least 0.3 mm and at most 2.3 mm, the glass quality such as the residual stress can be maintained. Making the thickness of the glass plate 11 to be at least 0.3 mm and at most 2.3 mm is particularly effective in maintaining the glass quality in deeply bent glass.

On the outside of the glass plate 11 and/or 12, a coating film having a function for water repellency, UV or IR cut, or a coating film having low reflection or low radiation properties, may be provided. Further, on the side of the glass plate 11 and/or 12 in contact with the interlayer film 13, a coating film with UV or IR cut, low radiation, visible light absorption, coloration, etc. may also be provided.

In a case where the glass plates 11 and 12 are inorganic glass with a curved shape, the glass plates 11 and 12 are subjected to bending molding after being formed by the float method and before being bonded by the interlayer film 13. Bending molding is conducted by softening the glass by heating. The heating temperature of the glass during the bending molding process is approximately from 550° C. to 700° C.

[Interlayer Film]

As the interlayer film 13, a thermoplastic resin is used in many cases, and, for example, thermoplastic resins which have been used for this type of application, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, an ethylene-ethyl acrylate copolymer resin, a cycloolefin polymer resin, an ionomer resin, etc. may be mentioned. Further, a resin composition containing the modified block copolymer hydride described in Japanese Patent No. 6065221 may also be suitably used.

Among them, a plasticized polyvinyl acetal resin is preferably used, since it is excellent in balance of various properties, such as transparency, weather resistance, strength, adhesive strength, penetration resistance, impact energy absorption, moisture resistance, heat shielding, and sound insulation. These thermoplastic resins may be used alone, or two or more types may be used in combination. The term "plasticized" in the above plasticized polyvinyl acetal resin means that it is plasticized by the addition of a plasticizer. The same applies to other plasticized resins.

However, in a case where a p-polarized light reflecting film 15 or the like is to be enclosed in the interlayer film 13, it may be degraded by a certain plasticizer depending on the type of the material to be enclosed, and in such a case, it is preferred to use a resin that does not substantially contain such a plasticizer. That is, there may be a case where it is preferred that the interlayer film 13 does not contain a plasticizer. As a resin that does not contain a plasticizer, an ethylene-vinyl acetate copolymer type resin may be mentioned.

The above polyvinyl acetal resin may be a polyvinyl formal resin obtainable by reacting polyvinyl alcohol (hereinafter referred to also as "PVA" as the case requires) with formaldehyde, a polyvinyl acetal resin in a narrow sense obtainable by reacting PVA with acetaldehyde, or a polyvinyl butyral resin obtainable by reacting PVA with n-butyraldehyde (hereinafter referred to also as "PVB" as the case requires). PVB may be mentioned as one particularly suitable, since it is excellent in balance of various properties such as transparency, weather resistance, strength, adhesive strength, penetration resistance, impact energy absorption, moisture resistance, heat shielding and sound insulation. These polyvinyl acetal resins may be used alone, or two or more types may be used in combination.

However, the material for forming the interlayer film 13 is not limited to a thermoplastic resin. Further, the interlayer film 13 may contain functional particles such as infrared absorbers, ultraviolet absorbers, luminescent agents, etc. Further, the interlayer film 13 may have a colored portion called a shade band. The coloring pigment to be used to form the colored portion may be one that can be used for plastics and may be one whereby the visible light transmittance of the colored portion becomes to be at most 40% and is not particularly limited, but, for example, organic coloring pigments such as azo, phthalocyanine, quinacridone, perylene, perinone, dioxazine, anthraquinone and isoindolino, and inorganic coloring pigments such as oxides, hydroxides, sulfides, chromates, sulfates, carbonates, silicates, phosphates, arsenates, ferrocyanides, carbon and metal powders, may be mentioned. These coloring pigments may be used alone, or two or more types may be used in combination. The amount of the coloring pigment to be added is arbitrary to meet the desired color tone, and is not particularly limited, so long as the visible light transmittance of the colored portion becomes to be at most 40%.

The film thickness of the interlayer film 13 is preferably at least 0.5 mm at the thinnest part. Further, in a case where the interlayer film 13 consists of multiple layers, the thickness of the interlayer film 13 is the film thickness having the film thicknesses of the respective layers totaled. If the thickness of the thinnest part of the interlayer film 13 is at least 0.5 mm, the impact resistance required for laminated glass will be sufficient. Further, the thickness of the interlayer film 13 is preferably at most 3 mm at the thickest part. When the maximum thickness of the interlayer film 13 is at most 3 mm, the mass of the laminated glass will not become too large. The maximum value of the thickness of the interlayer film 13 is more preferably at most 2.8 mm, further preferably at most 2.6 mm.

The interlayer film 13 may have two or more layers. For example, the sound insulation property of the laminated glass 10 can be improved by forming the interlayer by three or more layers and making the shear modulus of any of the layers except the layers on both sides to be smaller than the shear modulus of the layers on both sides e.g. by adjusting the plasticizer or the like. In such a case, the shear modulus of the layers on both sides may be the same or may be different.

Further, it is desirable that the respective layers in the interlayer film 13 are made of the same material, but the respective layers may be made of different materials. However, from the viewpoint of adhesiveness between the glass plates 11 and 12, or functional materials to be inserted into the laminated glass 10, it is desirable to use the above materials for at least 50% of the film thickness of the interlayer film 13.

To prepare the interlayer film 13, for example, the above resin materials to be used as the interlayer film are appropriately selected and extrusion molded in a heated molten state by using an extruder. The extrusion conditions such as the extrusion speed of the extruder are set to be uniform. The extrusion molded resin film is then stretched as the case requires, for example, to give curvature to the upper and lower edges in accordance with the design of the laminated glass, thereby completing the interlayer film 13.

[Laminated Glass]

The total thickness of the laminated glass 10 is preferably at least 2.8 mm and at most 10 mm. When the total thickness of the laminated glass 10 is at least 2.8 mm, sufficient rigidity can be secured. Further, when the total thickness of the laminated glass 10 is at most 10 mm, sufficient transmittance can be obtained and, at the same time, the haze can be reduced.

On at least one side of the laminated glass 10, the plate gap between the glass plate 11 and the glass plate 12 is preferably at most 1.5 mm, more preferably at most 1.0 mm. Here, the plate gap between the glass plate 11 and the glass plate 12 is the amount of misalignment between the edge of the glass plate 11 and the edge of the glass plate 12 in plan view.

When on at least one side of the laminated glass 10, the plate gap between the glass plate 11 and the glass plate 12 is at most 1.5 mm, such is suitable in that it does not damage the appearance. When on at least one side of the laminated glass 10, the plate gap between the glass plate 11 and the glass plate 12 is at most 1.0 mm, such is more suitable in that it does not damage the appearance.

To produce the laminated glass 10, a p-polarized light reflecting film 15 is attached to the vehicle exterior side of the glass plate 11 via an adhesive layer 16, and then, an interlayer film 13 is sandwiched between the glass plate 11 and the glass plate 12 to form a laminate. Then, for example, the laminate is placed in a rubber bag, a rubber chamber, a resin bag, or the like and bonded in a vacuum of from −65 to −100 kPa at a temperature of from about 70 to 110° C. The heating conditions, temperature conditions, and lamination method, are suitably selected in consideration of the nature of the p-polarized light reflecting film 15, for example, so that it does not deteriorate during lamination.

Further, by conducting a pressing process of heating and pressurizing under conditions of, for example, from 100 to 150° C. and a pressure of from 0.6 to 1.3 MPa, it is possible to obtain a laminated glass 10 which is more excellent in durability. In some cases, however, this heating and pressurizing process may not be used to simplify the process and to take into account the characteristics of the materials to be sealed in the laminated glass 10.

That is, a method so-called "cold bending" may be used in which the glass sheets 11 or 12 are joined together in such a state that either one or both of them are in an elastically deformed state. The cold bending can be accomplished by using a laminate consisting of a glass plate 11 (to which a p-polarized light reflecting film 15 is attached), a glass plate 12 and an interlayer film 13, which are fixed by a temporary fixing means such as a tape, a conventional pre-pressing device such as a nip roller or rubber bag, rubber chamber, etc., and an autoclave.

Between the glass plate 11 and the glass plate 12, in addition to the interlayer film 13 and the p-polarized light reflecting film 15, a film or a device having a function such as electric heating wire, infrared reflection, light emission, power generation, light control, touch panel, visible light reflection, scattering, decoration, absorption, etc., may be provided to the extent that the effects of this application are not impaired. Further, the surface of the laminated glass 10 may have a film having a function such as antifogging, water repellency, heat shielding, low reflection, etc. Further, the vehicle exterior side surface of the glass plate 11 and the vehicle interior side surface of the glass plate 12 may have a film having a function such as heat shielding, heat generation, etc.

In this way, in the HUD system 1, the laminated glass 10 is provided with a p-polarized light reflecting film 15 in the region where p-polarized visible light is incident, and the incident angle θ of the p-polarized visible light to the vehicle interior side surface of the laminated glass 10 is at least 42 deg and at most 72 deg. And the visible light reflectance of p-polarized light when the incident angle θ is 57 deg is at least 5%, and the ratio of the reflectance of the subsidiary image to the reflectance of the main image is at most 30% within the entire range of incident angle θ. This makes the main image sufficiently high in luminance relative to the subsidiary image, so that the subsidiary image becomes less noticeable and the visibility of the HUD image will be improved.

Second Embodiment

In the second embodiment, an example of adjusting the radius of the reflective surface of a concave mirror in the HUD system of the first embodiment will be shown. In the second embodiment, explanations with respect to the same components as in the already described embodiment may be omitted.

Figure 4:
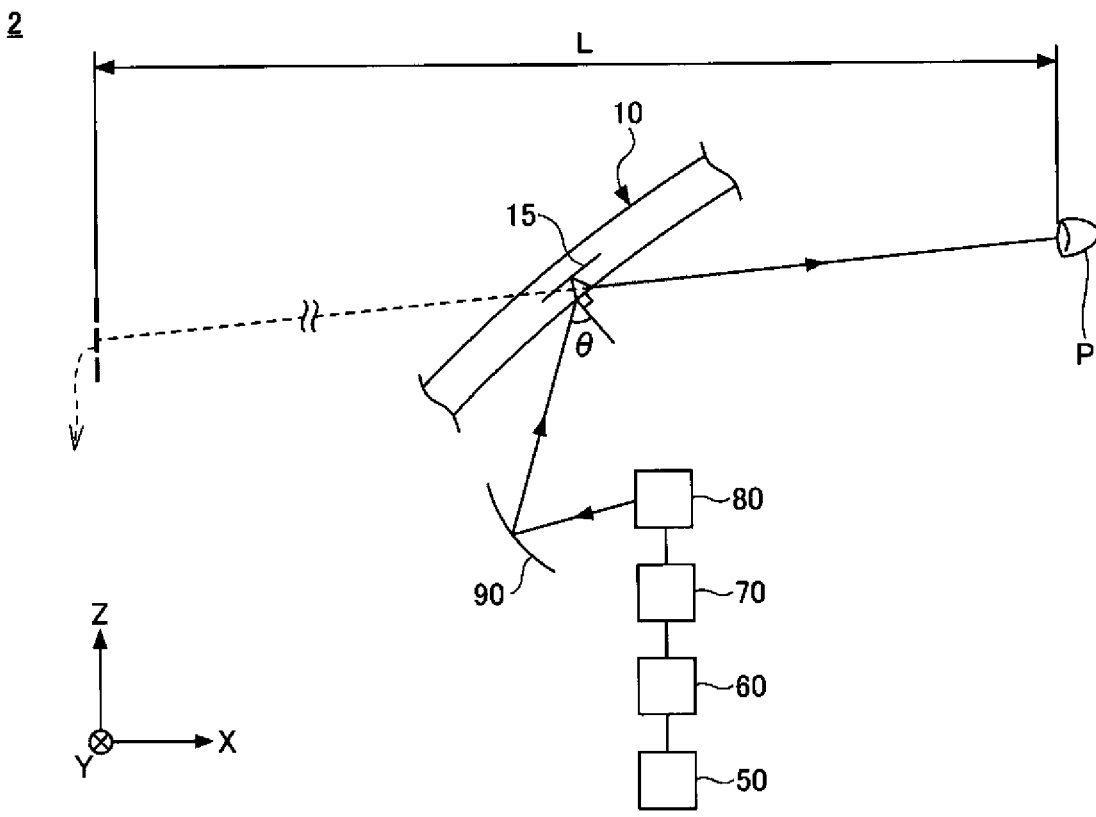
FIG. 4 is a schematic diagram illustrating the HUD system according to the second embodiment of the present invention.

FIG. 4 is a schematic diagram illustrating the HUD system according to the second embodiment. In the HUD system 2 shown in FIG. 4, the minimum radius R of the reflective surface of the concave mirror 90 is at least 100 mm and at most 700 mm. The minimum radius R=100 mm of the reflective surface of the concave mirror 90 is the molding limit of the concave mirror 90. Here, the minimum radius R of the reflective surface of the concave mirror 90 is the minimum radius in the curve formed when the plane passing through the center of gravity and parallel to the XZ plane intersects the concave mirror 90. Further, in FIG. 4, the front-back direction of the vehicle on which the laminated glass 10 is installed is X, the left-right direction of the vehicle is Y, and the direction perpendicular to the XY plane is Z.

By setting the minimum radius R of the reflective surface of the concave mirror 90 to be at most 700 mm, the HUD image distance L can be extended. The minimum radius R of the reflective surface of the concave mirror 90 is preferably at most 600 mm, more preferably at most 500 mm. The smaller the minimum radius R of the reflective surface of the concave mirror 90 is, the longer the HUD image distance L can be extended.

Here, the HUD image distance L is the distance from the center of the eye box based on SAE J1757-2 (2018) to the focal point of the virtual image V. The method of measuring the focal length of HUD is based on SAE J1757-2 (2018).

As the HUD image distance L becomes longer, the subsidiary image becomes darker, and at the same time, the amount of separation of the subsidiary image from the main image is suppressed, whereby the triple image becomes to be less noticeable. Further, as the HUD image distance L becomes longer, the virtual image V (HUD image) becomes closer to the driver's focal length while driving, whereby the visibility of the HUD image will be improved. The HUD image distance L is preferably at least 3,000 mm, more preferably at least 5,000 mm. The longer the HUD image distance L is, the more the separation of the subsidiary image from the main image can be suppressed, whereby the triple image becomes to be further less noticeable.

In this way, the HUD system 2 is provided with, in addition to the requirements of HUD system 1, such a requirement that the minimum radius R of the reflective surface of the concave mirror 90 is at least 100 mm and at most 700 mm. This increases the HUD image distance L and makes the subsidiary image to be less noticeable, thus further improving the visibility of the HUD image.

Third Embodiment

In the third embodiment, an example where the laminated glass is wedge-shaped in cross section in the HUD system of the first embodiment, is shown. Here, in the third embodiment, explanations with respect to the same components as in the previously described embodiments may be omitted.

Figure 5:
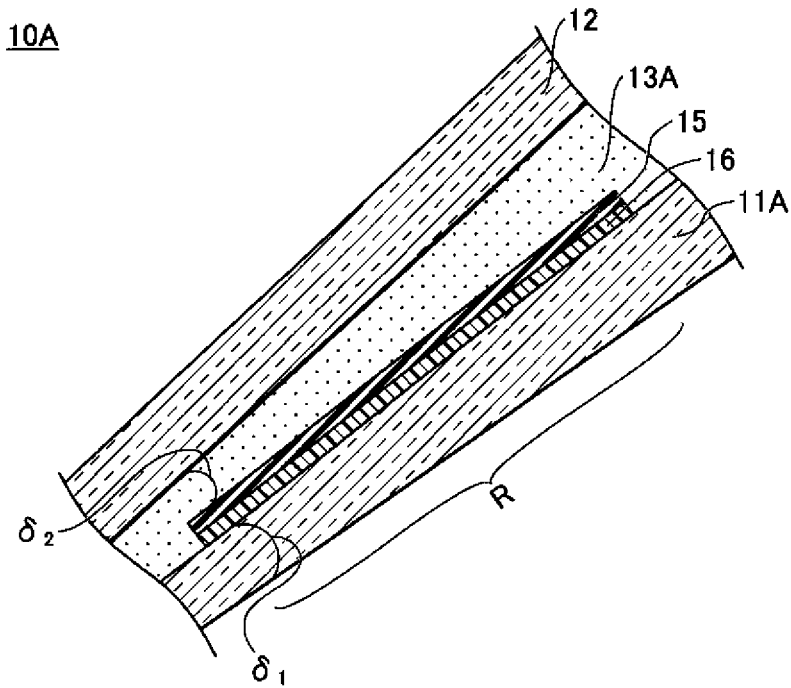
FIG. 5 is a partially enlarged cross-sectional view illustrating laminated glass according to the third embodiment of the present invention (Part 1).

FIG. 5 is a partially enlarged cross-sectional view illustrating the laminated glass according to the third embodiment. The HUD system according to the third embodiment is one wherein in the HUD system 1 according to the first embodiment, laminated glass 10 is replaced by laminated glass 10A. In the laminated glass 10A shown in FIG. 5, unlike the laminated glass 10, at least in the HUD display region R, the glass plate 11A and the interlayer film 13A are wedge-shaped in cross section.

That is, the glass plate 11A has such a wedge shape in cross-sectional view that at least in the HUD display region R, the thickness of the upper edge in the vertical direction is thicker than that of the lower edge when the laminated glass 10A is installed in a vehicle, and the wedge angle of the wedge-shaped area in cross-sectional view is $\delta_1$. Further, the interlayer film 13A is, at least in the HUD display region R, wedge-shaped in cross-sectional view with the thickness of the upper edge in the vertical direction being thicker than that of the lower edge when the laminated glass 10A is installed in a vehicle, and the wedge angle of the wedge-shaped area in cross-sectional view is $\delta_2$. Here, the thickness of the glass plate 12 is constant.

The wedge angle is defined by the following formula.

Wedge angle=(top edge thickness−bottom edge
thickness)/distance along the glass connecting
the top edge and the bottom edge (Top edge (bottom edge) thickness: The thickness of glass at the top edge (bottom edge) in the vertical cross-sectional plane through the center of gravity of the HUD display region).

Further, substrates other than glass (e.g. films) will be defined in the same way.

In this way, in the HUD display region R, the member located on the vehicle interior side than the p-polarized light reflecting film 15 and the member located in the exterior side than the p-polarized light reflecting film 15, are formed in a wedge shape in cross section, and the wedge angles $\delta_1$ and $\delta_2$ are set to be appropriate values. This makes the triple image to be less noticeable, as shown in FIG. 6.

Figure 6:
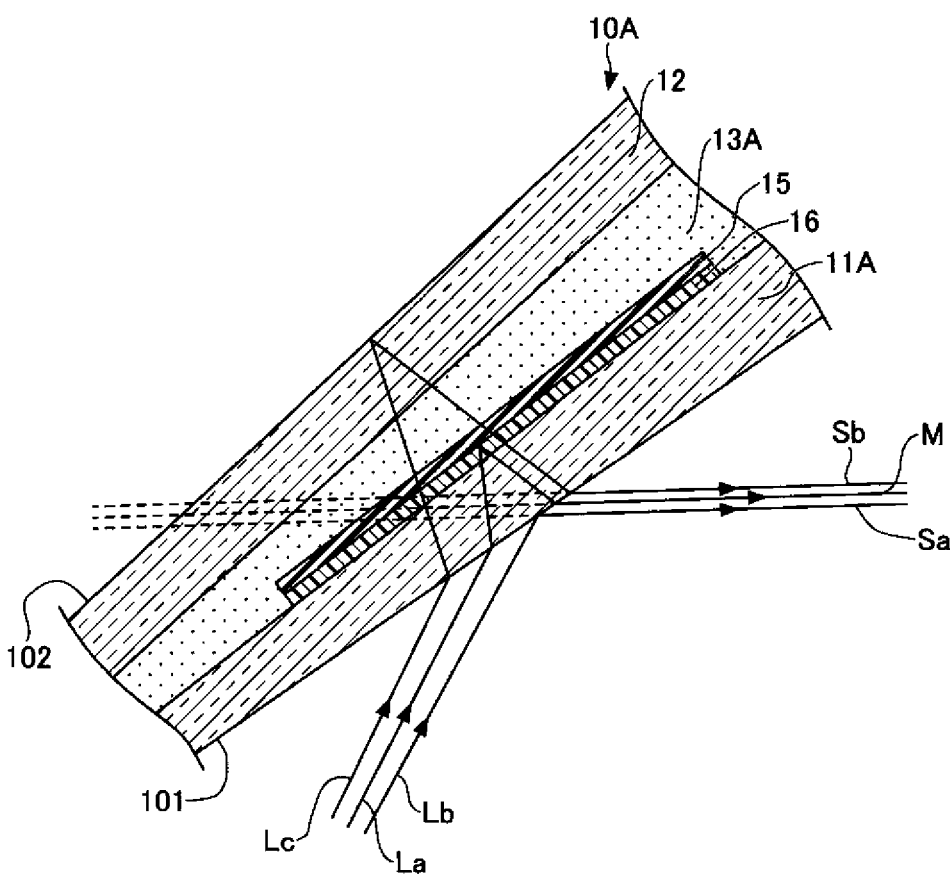
FIG. 6 is a partially enlarged cross-sectional view of laminated glass explaining the subsidiary image (Part 2).

That is, as shown in FIG. 6, the main image reflected light M, the first subsidiary image reflected light Sa, and the second subsidiary image reflected light Sb roughly match one another, whereby it is possible to make the triple image to be less noticeable. Here, the main image reflected light M is such light that the light La from the concave mirror is reflected by the p-polarized reflecting film 15. Further, the first subsidiary image reflected light Sa is such light that the light Lb from the concave mirror is reflected by the vehicle interior side surface 101 of the laminated glass 10, and the second subsidiary image reflected light Sb is such light that the light Lc from the concave mirror is reflected by the vehicle exterior side surface 102 of the laminated glass 10.

In the wedge-shaped cross-sectional area of the HUD display region R, the wedge angles $\delta_1$ and $\delta_2$ are preferably larger than 0 mrad and at most 1.0 mrad, respectively. That is, the total of wedge angles of the members located on the vehicle exterior side than the p-polarized light reflecting film 15 is preferably larger than 0 mrad and at most 1.0 mrad, and the total of wedge angles of the members located on the vehicle interior side is larger than 0 mrad and at most 1.0 mrad. It is thereby possible to make the distance between the main image and the subsidiary image to be reduced so that the main image and the subsidiary image may almost overlap each other, thus making the triple image sufficiently less noticeable. For example, it is possible to make the distance between the main image and the subsidiary image (subsidiary image separation amount) to be at most 1.0 mrad. Here, the subsidiary image separation amount being 1.0 mrad means that the distance between the main image and the subsidiary image is 1 mm when the HUD image distance L is 1 m. In this case, for example, when the HUD image distance L is 2 m, the distance between the main image and the subsidiary image will be 2 mm.

It is further preferred that the wedge angles $\delta_1$ and $\delta_2$ are, respectively, larger than 0 mrad and at most 0.2 mrad. It is even more preferred that the wedge angles 61 and $\delta_{are}$ both larger than 0 mrad and at most 0.2 mrad.

Further, the total of the wedge angle $\delta_1$ and the wedge angle $\delta_2$ is preferably at most 1.2 mrad. That is, the total of wedge angles of the plurality of members with a wedge shape in cross section is preferably at most 1.2 mrad. This makes it possible to prevent the laminated glass 10 from becoming excessively thick.

The wedge angles $\delta_1$ and $\delta_2$ are ones obtained by dividing the difference in thickness between the upper and lower edges of the HUD display region R in the vertical direction when the laminated glass 10 is installed in a vehicle, by the distance along the glass between the upper and lower edges. Here, the thickness is, in the case of the wedge angle $\delta_1$, the thickness of a member located on the vehicle exterior side than the p-polarized light reflecting film 15, and in the case of the wedge angle $\delta_2$, the thickness of a member located on the vehicle interior side than the p-polarized light reflecting film 15. The increase in thickness from the lower edge side to the upper edge side of the laminated glass 10 may be a monotonic increase where the rate of increase is constant, or the rate of increase may vary in parts.

In the example of FIG. 5, the glass plate 11 and the interlayer film 13 are formed in a wedge shape in cross section, but the construction is not limited to this. That is, in the HUD display region R, the construction may be such that among the glass plate 11, the glass plate 12 and the interlayer film 13, at least one of the members located on the vehicle exterior side than the p-polarized light reflecting film 15, has a wedge-shaped cross-sectional area, and at least one of the members located on the vehicle interior side than the p-polarized light reflecting film 15 has a wedge-shaped cross-sectional area. It is thereby possible to obtain an effect of making the triple image to be less noticeable.

Figure 7:
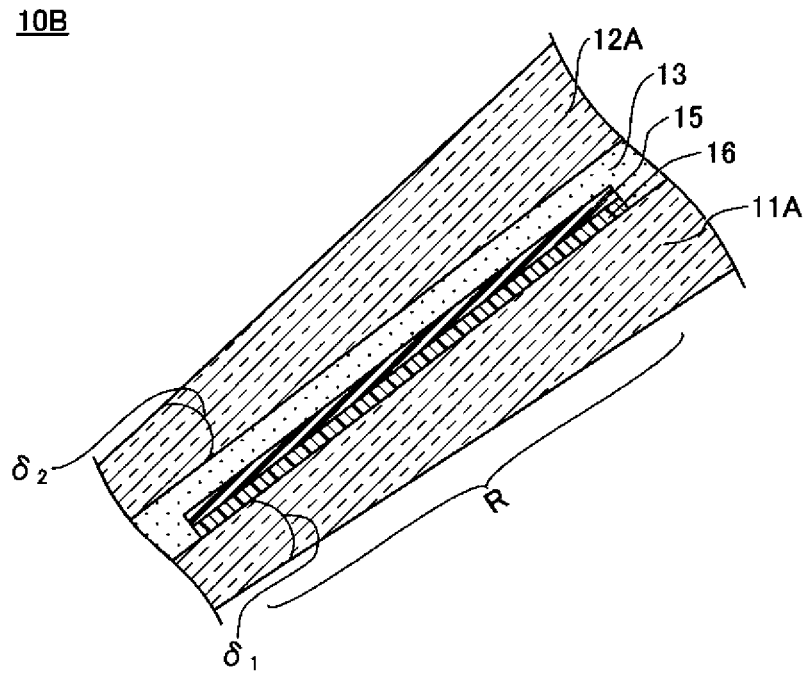
FIG. 7 is a partially enlarged cross-sectional view of laminated glass according to the third embodiment (Part 2).

For example, as shown by laminated glass 10B in FIG. 7, the thickness of the interlayer film 13 may be made to be constant, and the glass plates 11 and 12 may be formed in a wedge shape in cross section. Further, although not shown in the drawings, in a state in FIG. 7, the interlayer film 13 may also be formed in a wedge shape in cross section. In such a case, the glass plates 11 and 12 and the interlayer film 13 become to be wedge-shaped in cross-sectional view.

In any of the above cases, the total of wedge angles of the members located on the vehicle exterior side than the p-polarized light reflecting film 15 is preferably larger than 0 mrad and at most 1.0 mrad, and the total of wedge angles of the members located on the vehicle interior side than the p-polarized light reflecting film 15 is preferably larger than 0 mrad and at most 1.0 mrad. It is thereby possible to make the distance between the main image and the subsidiary image to be reduced so that the main image and the subsidiary image may almost overlap each other, thus making the triple image sufficiently less noticeable.

Further, in a case where glass plates 11 and 12 are produced, for example, by a float method, they can be formed in a wedge shape in cross section by devising the production conditions. Specifically, by adjusting the peripheral speed of a plurality of rolls disposed at both ends in the width direction of the glass ribbon traveling on a molten metal, the glass cross section in the width direction can be made concave, convex, or tapered, and a portion having an optional thickness change may be cut out.

In this way, in laminated glass 10A and 10B, the p-polarized light reflecting film 15 is disposed between the glass plate 11 and the glass plate 12 in contact with the interlayer film 13. And the glass plate 12 and/or the interlayer film 13, located on the vehicle exterior side than the p-polarized light reflecting film 15, and the glass plate 11 located on the vehicle interior side than the p-polarized light reflecting film 15, have a wedge-shaped cross-sectional area. It is thereby possible to make the distance between the main image and the subsidiary image to be reduced so that the main image and the subsidiary image will almost overlap each other, thus making the triple image sufficiently less noticeable.

The third embodiment may be combined with the second embodiment. In such a case, the triple image may be made even less noticeable.

Modified Example 1 of First Embodiment

In Modified Example 1 of the first embodiment, an example of variation in the position where the p-polarized light reflecting member is disposed, is shown. In Modified Example 1 of the first embodiment, explanations with respect to the same constituting components as in the already described embodiments may be omitted.

FIGS. 8 to 12 are drawings to illustrate laminated glass according to Modified Example 1 of the first embodiment. As in the laminated glass 10C shown in FIG. 8, the p-polarized light reflecting film 15 may be attached to the vehicle interior side surface of the glass plate 12 via an adhesive layer 16. Further, as shown in the laminated glass 10D shown in FIG. 9, the p-polarized light reflecting film 15 may be attached to the vehicle interior side of the glass plate 11 via an adhesive layer 16. In the case of the laminated glass 10D, the surfaces that reflect the light from the concave mirror are two i.e. the vehicle interior side surface of the p-polarized light reflecting film 15 and the vehicle interior side surface of the glass plate 12, whereby a triple image is not formed, but the main image and a double image are formed.

<P-Polarized Light Reflecting Coating>

Further, as a p-polarized light reflecting member, p-polarized light reflecting coating 25 may be used instead of the p-polarized light reflecting film 15, which is a kind of the p-polarized light reflective member. Use of the p-polarized light reflecting coating 25 instead of the p-polarized light reflecting film 15 is preferred in that the visibility will be excellent e.g. at low luminance at night and at wider Field Of View. Further, such is preferred also from a viewpoint that control of the thickness will be easy, and the reflective surface tends to be smooth, whereby the HUD image will be less likely to be distorted. The thickness of the p-polarized light reflecting coating 25 is, for example, at least 50 nm and at most 500 nm. As the film constituting the p-polarized light reflecting coating 25, for example, silver, gold, copper, aluminum, zinc oxide, titanium oxide, tin oxide, silicon oxide, etc. may be used. The p-polarized light reflecting coating 25 may be formed on the surface of a glass plate by, for example, a sputtering method or a CVD method. From the viewpoint of reflection efficiency, the attaching position of the p-polarized light reflecting coating is preferably on the surface (4th surface) on the vehicle interior side of the glass plate 11 in FIG. 2B.

The interior side sheet (4th surface) of the laminated glass may include a first coating that is a p-polarized light reflecting coating. The first coating includes at least one layer of a high refractive index material and at least one layer of a low refractive index material. In the scope of the present invention, such an arrangement is referred to as a "high/low" arrangement (sequence).

In some embodiments, the first coating may include alternating layers of high and low refractive indices. That is, the first coating may include two or more layers of a high refractive index material and/or two or more layers of a low refractive index material. In such a case, the "high/low" sequence may occur multiple times, i.e., the sequence may be repeated at least twice. Up to three or four or more repetitive sequences may be provided. In some cases, the repeated sequence will be at most three times. The repetition of the above sequence is preferably once for the production efficiency.

In the scope of the present invention, the interior side sheet provided with the first coating is suitable to withstand the heat tempering process. Therefore, such an interior side sheet may be subjected to the heat tempering process.

Within the scope of the present invention, the refractive index of the high refractive index layer is typically at least 1.8, at least 1.9, at least 2.0 or at least 2.1, and at most 2.5, at a wavelength of 550 nm. Within the scope of the present invention, the refractive index of the low refractive index layer is typically ≤1.8, ≤1.7 or ≤1.6, and at least 1.2, at a wavelength of 550 nm.

Within the scope of the present invention, at least one high refractive index layer of the first coating preferably includes at least one of the following:

Oxides of Zr, Nb and Sn;

Mixed oxides of Ti, Zr, Nb, Si, Sb, Sn, Zn and In;

Nitrides of Si and Zr;

Mixed nitrides of Si and Zr.

In some embodiments of the present invention, at least one high refractive index layer of the first coating preferably includes at least one of titanium zirconium mixed oxide, titanium silicon mixed oxide, niobium zirconium mixed oxide, silicon zirconium mixed nitride, and aluminum. Alternatively, it is preferably doped silicon nitride, zirconium oxide, indium tin mixed oxide, zinc aluminum mixed oxide, antimony tin mixed oxide, or titanium zinc mixed oxide.

Typically, the high refractive index material is selected to be such that it will not be subjected to a major crystallinity change during heat tempering. Therefore, in this context, in a case where there is only one high refractive index layer in the first coating, titanium oxide is not recommended as a high refractive index material.

Examples of the low refractive index material include silicon oxide, silicon oxynitride, silicon oxy-carbide, or a mixture, e.g. mixed oxides of silicon and aluminum, or mixed oxides of silicon and zirconium.

The first coating may include a first layer of a high refractive index material in contact with the laminated glass and a first layer of a low refractive index material on top of the first layer of the high refractive index material. In such an embodiment, the thickness (geometric film thickness) of the first layer of the high refractive index material may optionally be made of one or a plurality of sublayers and may be within a range of from 50 to 100 nm, or from 60 to 80 nm. In such an embodiment, the thickness (geometric film thickness) of the first layer of the low refractive index material, optionally made of one or a plurality of sublayers, may independently be within a range of from 70 to 160 nm, or from 80 to 120 nm.

In another embodiment of the present invention, it is also possible that repetition of the "high/low" sequence is twice. Specifically, in a case where the first coating includes the first layer of a high refractive index material in contact with the laminated glass, and the above first layer of a low refractive index material, the construction may be such that the first layer of the high refractive index material, and a second layer of the high refractive index material on top of the first layer of the low refractive index material, and a second layer of the low refractive index material on top of the second layer of the high refractive index material.

In such an embodiment of the two "high/low" repeated sequences, the first coating preferably has the following construction a, b, c and d. The film thickness refers to the geometric film thickness.

a. A first layer of a high refractive index material having a thickness of from 1 to 15 nm, or a thickness of from 2 to 11 nm, in contact with the laminated glass.

b. A first layer of a low refractive index material having a thickness of from 150 to 210 nm, or a thickness of from 150 to 220 nm, on top of the first layer of a high refractive index material.

c. A second layer of a high refractive index material having a thickness of from 50 to 100 nm, a thickness of from 40 to 90 nm, or a thickness of from 55 to 75 nm, on top of the first layer of a low refractive index material.

d. A second layer of a low refractive index material having a thickness of from 95 to 115 nm, or a thickness of from 70 to 160 nm, on top of the second layer of a high refractive index material.

In such examples of two or more "high/low" repeated sequences, at least one of the high refractive index layers of the first coating contains at least one of the following:

Oxides of Zr, Nb and Sn;

Mixed oxides of Ti, Zr, Nb, Si, Sb, Sn, Zn and In;

Nitrides of Si and Zr;

Mixed nitrides of Si and Zr.

In a case where there are two or more high refractive index layers in the first coating, i.e. in a case where there are two or more "high/low" sequences in the first coating, at least one of the high refractive index layers contains at least one of the following:

Oxides of Zr, Nb and Sn;

Mixed oxides of Ti, Zr, Nb, Si, Sb, Sn, Zn and In;

Nitrides of Si and Zr;

Mixed nitrides of Si and Zr.

On the other hand, two or more high refractive index layers may independently contain at least one of the following:

An oxide of Zr, Nb, Sn, Ti, Bi, Ga, Gd, Hf, Mg, W or Y, which is eventually doped with Al, B, F, In, Si, Sb or Sn;

Mixed oxides of Ti, Zr, Nb, Si, Sb, Sn, Zn, In and B;

Nitrides of Si and Zr;

Mixed nitrides of Si and Zr.

From such a viewpoint, in a case where the first coating has multiple high refractive index layers, titanium oxide may not be recommended as a high refractive index material.

In another embodiment of the present invention, in a case where the repetition of the "high/low" sequence is three times, the first coating comprises a first layer of a high refractive index material in contact with the laminated glass, and a first layer of a low refractive index material on top of the first layer of a high refractive index material. The construction is such that a second layer of a high refractive index material on top of the first layer of a low refractive index material, a second layer of a low refractive index material on top of the second layer of the high refractive index material, a third layer of a high refractive index material on top of the second layer of a low refractive material, and a third layer of a low refractive index material on top of the third layer of the high refractive index material.

In all embodiments, the thicknesses of different layers may be varied independently within the limits provided by the present invention, in order to finely adjust the technical effects provided by the present invention.

Within the scope of the present invention, the term "below" indicates the relative position of a layer to the next layer in the layer sequence starting from the substrate. Within the scope of the present invention, the term "top" indicates the relative position of the layer to the next layer in the layer sequence starting from the substrate.

Within the scope of the present invention, a second coating may be provided. The relative position of a layer in an optionally selected second coating does not necessarily imply direct contact. That is, an intermediate layer may be provided between the first and second layers. In some cases, a layer may actually consist of several individual layers (or sublayers). In some cases, the relative position may imply direct contact. In most cases, the optional second coating does not include a nitride-containing layer in contact with the glass surface.

Figure 10:
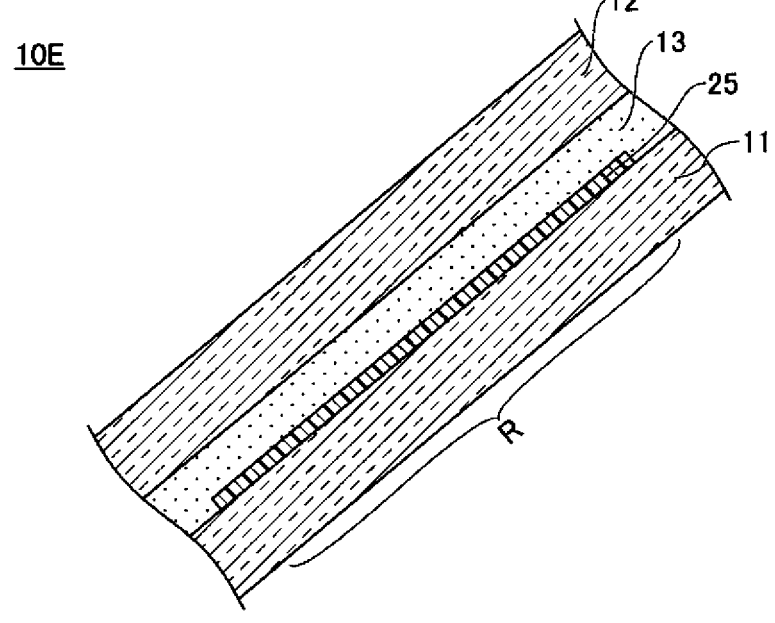
FIG. 10 is a partially enlarged cross-sectional view illustrating laminated glass according to Variation Example 1 of the first embodiment (Part 3).

In the case of using a p-polarized light reflecting coating 25, for example, like laminated glass 10E shown in FIG. 10, the p-polarized light reflecting coating 25 may be disposed on the vehicle exterior side surface of the glass sheet 11. Further, like laminated glass 10F shown in FIG. 11, the p-polarized light reflecting coating 25 may be disposed on the vehicle interior side surface of the glass plate 12. Further, like laminated glass 10G shown in FIG. 12, the p-polarized light reflecting coating 25 may be disposed on the vehicle interior side surface of the glass plate 11. From the viewpoint of p-polarized light reflection properties, the p-polarized light reflecting coating 25 is preferably disposed on the vehicle interior side surface of the glass plate 11. In the case of the laminated glass 10G, there are two surfaces that reflect the light from the concave mirror, i.e. the vehicle interior side surface of the p-polarized light reflecting coating 25 and the vehicle interior side surface of the glass plate 12, whereby a triple image will not be formed, but the main image and a double image will be formed.

Further, even in the case of using the p-polarized light reflecting coating 25, the properties related to the HUD system described in paragraphs 0037 to 0050, etc., are applicable like the p-polarized light reflecting film.

The forms in FIGS. 8 to 12 may be applied to the second and third embodiments. When applied to the third embodiment, in the HUD display region R, among the glass plate 11, the glass plate 12 and the interlayer film 13, at least one of the members located on the vehicle exterior side than the p-polarized light reflecting film 15 has a wedge-shaped cross-sectional area, and at least one of the members located on the vehicle interior side than the p-polarized light reflecting film 15 has a wedge-shaped cross-sectional area. By setting the respective wedge angles to appropriate values, it is possible to make the triple image to be less noticeable as in FIG. 6.

Further, a film or coating having a function such as infrared reflection may be disposed on the vehicle exterior side surface or vehicle interior side surface than the p-polarized light reflecting film 15 or p-polarized light reflecting coating 25. In such a case, the total of wedge angles of the members located between the surfaces on which the film or coating is disposed is preferably larger than 0 mrad and at most 1.0 mrad.

Figure 8:
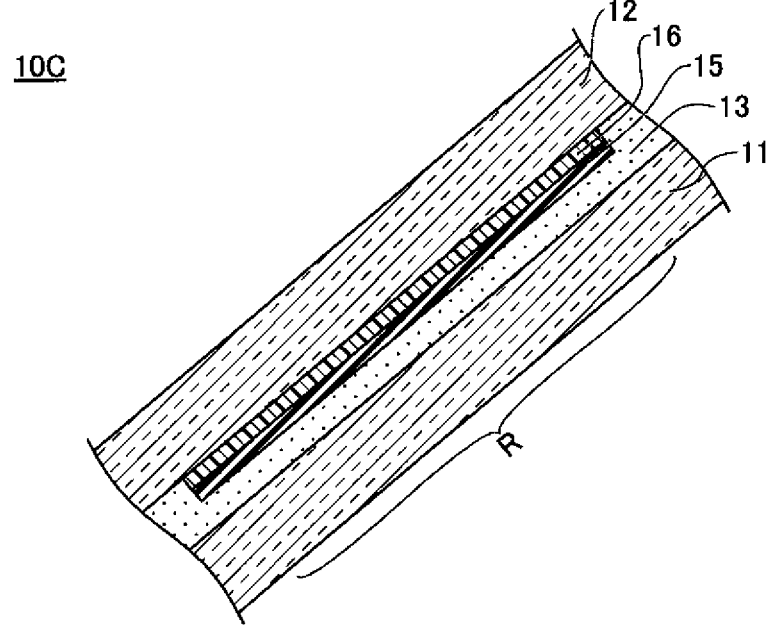
FIG. 8 is a cross-sectional view illustrating laminated glass according to Variation Example 1 of the first embodiment (Part 1).
Figure 9:
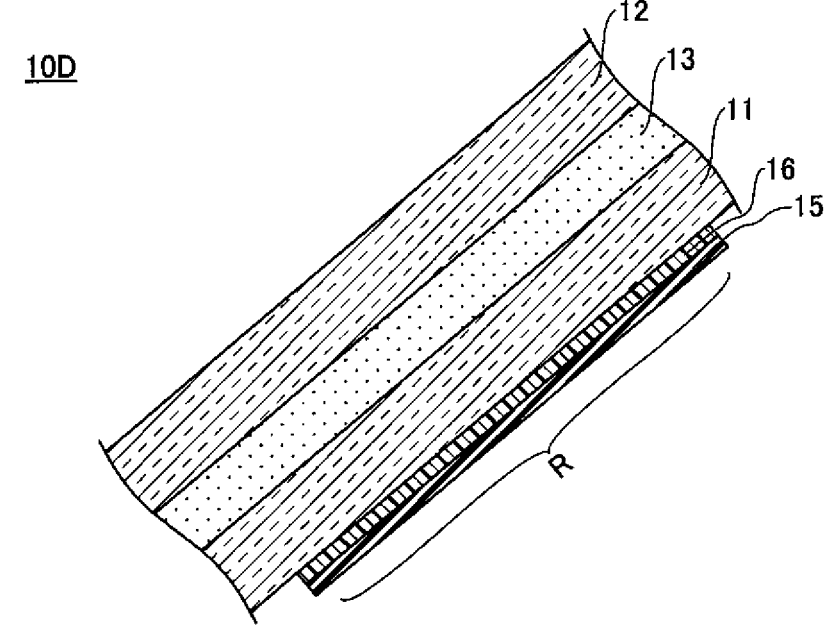
FIG. 9 is a partially enlarged cross-sectional view illustrating laminated glass according to Variation Example 1 of the first embodiment (Part 2).
Figure 11:
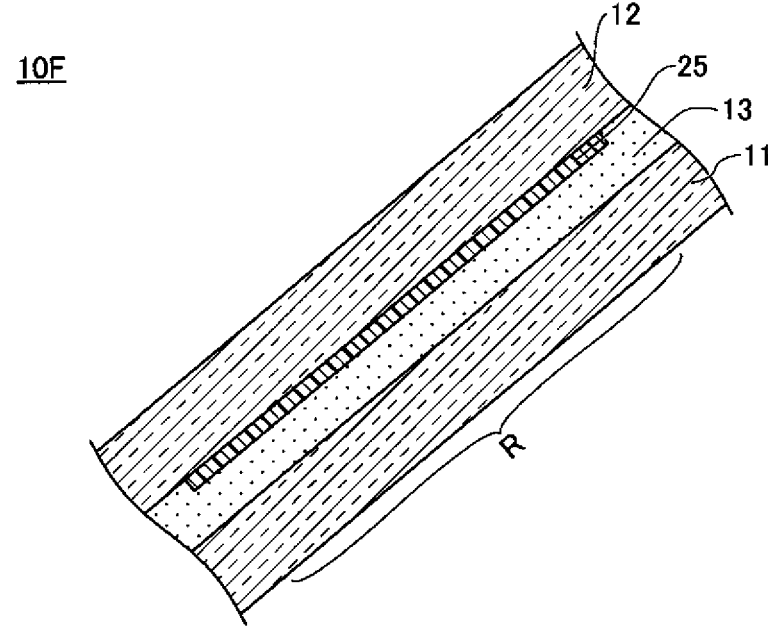
FIG. 11 is a partially enlarged cross-sectional view illustrating laminated glass according to Variation Example 1 of the first embodiment (Part 4).
Figure 12:
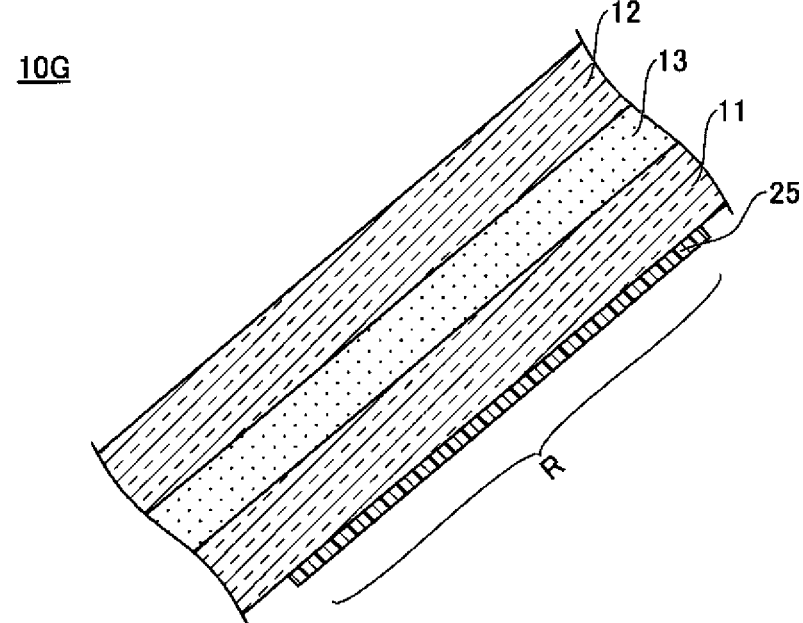
FIG. 12 is a partially enlarged cross-sectional view illustrating laminated glass according to Variation Example 1 of the first embodiment (Part 5).

For example, in the case of FIGS. 8 and 11, the glass plate 11 and/or the interlayer film 13, and the glass plate 12, are formed in a wedge shape in cross section. In the case of FIGS. 9 and 12, at least one of the glass plate 11, the glass plate 12 and the interlayer film 13 is formed in a wedge shape in cross section. Further, in the case of FIG. 10, the glass plate 11, and the glass plate 12 and/or the interlayer film 13, are formed in a wedge shape in cross section.

EXAMPLES

In the following, Examples will be described, but the present invention is not limited in any way to these Examples.

[Ex. 1] (p-Polarized Light Reflecting Film)

Glass plate A (commonly known as FL, manufactured by AGC Inc.), which becomes to be the interior plate (the glass plate on the vehicle interior side) when made into laminated glass, and glass plate B (commonly known as FL, manufactured by AGC Inc.), which becomes to be the exterior plate (the glass plate on the vehicle exterior side) were prepared. The dimensions of glass sheets A and B were 300 mm×300 mm×2 mm thick. Further, interlayer film C (PVB manufactured by Sekisui Chemical Co., Ltd., thickness 0.76 mm) was prepared. Each of the glass plate A, glass plate B and interlayer film C is not wedge-shaped in cross-sectional view, and has a constant thickness.

Next, a p-polarized light reflecting film was attached via an adhesive layer to the surface (3rd surface) which becomes to be the vehicle exterior side of glass plate A. Here, 4th surface is the vehicle interior side surface of glass A, 3rd surface is the vehicle exterior side of glass A, 2nd surface is the vehicle interior side surface of glass B, and 1st surface is the vehicle exterior side surface of glass B.

Then, a laminate was made by sandwiching the interlayer film C between the glass plate A to which the p-polarized light reflecting film was attached via an adhesive layer, and the glass plate B. The laminate was put in a rubber bag and bonded in a vacuum of from −65 to −100 kPa at a temperature of from about 70 to 110° C. Laminated glass LG1 was prepared by pressurizing and heating under conditions at a pressure of from 0.6 to 1.3 MPa and a temperature of from about 100 to 150° C.

With respect to the laminated glass LG1, the visible light reflectance of p-polarized light at an incident angle of 57 deg and the visible light reflectance of p-polarized light at an incident angle of 66 deg were measured and found to be 3% and 5%, respectively. Here, the method for measuring the visible light reflectance of p-polarized light is as described above.

Ex. 2

Laminated glass LG2 was prepared in the same manner as in Ex. 1, except that a p-polarized light reflecting film different in reflectance was bonded to 3rd surface of the glass plate A.

With respect to the laminated glass LG2, the visible light reflectance of p-polarized light at an incident angle of 57 deg and the visible light reflectance of p-polarized light at an incident angle of 66 deg were measured and found to be 5% and 7%, respectively. Here, the method for measuring the visible light reflectance of p-polarized light is as described above.

Ex. 3

Laminated glass LG3 was prepared in the same manner as in Ex. 1, except that a p-polarized light reflecting film different in reflectance was bonded to 3rd surface of the glass plate A.

With respect to the laminated glass LG3, the visible light reflectance of p-polarized light at an incident angle of 57 deg and the visible light reflectance of p-polarized light at an incident angle of 66 deg were measured and found to be 5% and 7%, respectively. Here, the method for measuring the visible light reflectance of p-polarized light is as described above.

Ex. 4

Laminated glass LG4 was prepared in the same manner as in Ex. 1, except that a p-polarized light reflecting film different in reflectance was bonded to 4th surface of the glass plate A.

With respect to the laminated glass LG4, the visible light reflectance of p-polarized light at an incident angle of 57 deg and the visible light reflectance of p-polarized light at an incident angle of 66 deg were measured and found to be 5% and 7%, respectively. Here, the method for measuring the visible light reflectance of p-polarized light is as described above.

Ex. 5

Laminated glass LG5 was prepared in the same manner as in Ex. 1, except that a p-polarized light reflecting film different in reflectance was bonded to 3rd surface of the glass plate A.

With respect to the laminated glass LG5, the visible light reflectance of p-polarized light at an incident angle of 57 deg and the visible light reflectance of p-polarized light at an incident angle of 66 deg were measured and found to be 5% and 7%, respectively. Here, the method for measuring the visible light reflectance of p-polarized light is as described above.

Ex. 6

Laminated glass LG6 was prepared in the same manner as in Ex. 1, except that the wedge angle of the glass plate A was made to be 0.1 mrad, and the wedge angle of the interlayer film C was made to be 0.15 mrad, and a p-polarized light reflecting film different in reflectance was bonded to 3rd surface of the glass plate A. Here, the thickness of the glass plate B was kept constant.

With respect to the laminated glass LG6, the visible light reflectance of p-polarized light at an incident angle of 57 deg and the visible light reflectance of p-polarized light at an incident angle of 66 deg were measured and found to be 5% and 7%, respectively. Here, the method for measuring the visible light reflectance of p-polarized light is as described above.

Ex. 7

Laminated glass LG7 was prepared in the same manner as in Ex. 1, except that the wedge angle of the interlayer film C was made to be 0.25 mrad, and a p-polarized light reflecting film different in reflectance was bonded to 4th surface of the glass plate A. Here, the thicknesses of the glass plate A and the glass plate B were kept constant.

With respect to the laminated glass LG7, the visible light reflectance of p-polarized light at an incident angle of 57 deg and the visible light reflectance of p-polarized light at an incident angle of 66 deg were measured and found to be 5% and 7%, respectively. Here, the method for measuring the visible light reflectance of p-polarized light is as described above.

[Evaluations]

The minimum R of the concave mirror and the HUD image distance in the HUD system were set as shown in FIG. 13. And, in the vertical direction of each of the laminated glass LG1 to LG7 prepared in Ex. 1 to Ex. 7, an intermediate image was projected at an incident angle of at least 63 deg and at most 66 deg, and the HUD image was observed from the center of the eye box based on SAE J1757-2 (2018). And, the subsidiary image separation amount of the 4th surface reflection (the distance between the subsidiary image of the 4th surface reflection and the main image) and the subsidiary image separation amount of the 1st surface reflection (the distance between the 1st surface reflection and the main image) were measured. Here, in the case where the p-polarized light reflecting film is attached to the 4th surface, the subsidiary image of the 4th surface reflection will not occur.

The subsidiary image separation amount of the 4th surface reflection and the subsidiary image separation amount of the 1st surface reflection, were judged to be ○ (pass: acceptable) when at most 2.0 mrad, to be ◎ (pass: good) when at most 1.5 mrad, to be ☆ (pass: excellent) when at most 1.0 mrad, and to be x (failure) when larger than 2.0 mrad. The judgment results are shown in FIG. 13. Here, when the subsidiary image separation amount of the 4th surface reflection and the subsidiary image separation amount of the 1st surface reflection are at most 2.0 mrad, the visibility of the HUD image will be at a no-problematic level, and when they become smaller values, the visibility of the HUD image will be further improved.

Further, the subsidiary image reflectance/main image reflectance at an incident angle of 66 deg (maximum incident angle) was measured. The measurement method is as described above. Here, at the time when the incident angle is the maximum, the subsidiary image reflectance/main image reflectance becomes to be the maximum. Therefore, the subsidiary image reflectance/main image reflectance within the entire range of incident angle of at least 63 deg and at most 66 deg, becomes to be at most the subsidiary image reflectance/main image reflectance at the incident angle of 66 deg (maximum incident angle).

The subsidiary image reflectance/main image reflectance was judged to be ○ (pass) when at most 30% and to be x (failure) when larger than 30%. The judgment results are shown in FIG. 13. When the subsidiary image reflectance/main image reflectance is at most 30%, the visibility of the HUD image will be at a no-problematic level.

As shown in FIG. 13, in Ex. 1, the visible light reflectance of p-polarized light at an incident angle of 57 deg was less than 5%, whereby the main image became dark and the subsidiary image reflectance/main image reflectance became to be larger than 30% (failure). On the other hand, in Ex. 2 to Ex. 7, the visible light reflectance of p-polarized light at an incident angle of 57 deg was at least 5%, whereby the main image was relatively bright and the subsidiary image reflectance/main image reflectance became to be at most 30% (pass). Further, the subsidiary image separation amount of the 4th surface reflection and the subsidiary image separation amount of the 1st surface reflection were not larger than 2.0 mrad in any of Ex. 1 to Ex. 7, and were all "pass". From the results, it can be said that when the visible light reflectance of p-polarized light at an incident angle of 57 deg is at least 5%, the subsidiary image reflectance/main image reflectance becomes to be at most 30%, and sufficient visibility of the HUD image can be obtained.

Further, in Ex. 3 where the minimum R of the concave mirror is 700 mm, the subsidiary image separation amount of the 4th surface reflection and the subsidiary image separation amount of the 1st surface reflection become smaller than in Ex. 1 and Ex. 2 where the minimum R of the concave mirror is 800 mm, and in Ex. 5 where the minimum R of the concave mirror is 100 mm, they are particularly small. From the results, it can be said that the smaller the minimum R of the concave mirror is, the better the visibility of the HUD image becomes.

Further, in Ex. 4, the number of subsidiary images is only one with the 1st surface reflection, whereby the visibility of the HUD image is better than one where multiple subsidiary images will form.

Further, in Ex. 6 and Ex. 7 where the minimum R of the concave mirror is 700 mm and the glass plate and/or the interlayer film is wedge-shaped in cross section, the subsidiary image separation amount of the 4th surface reflection and/or the subsidiary image separation amount of the 1st surface reflection was 0 mrad. From the results, it can be said that by adjusting the minimum R of the concave mirror to an appropriate value of at most 700 mm and by making the glass plate and/or the interlayer film to be wedge-shaped in cross section, it is possible to make the subsidiary image to be hardly seen, and it is possible to substantially improve the visibility of the HUD image.

[Ex. 8] (p-Polarized Light Reflecting Coating)

All optical parameters are 2° to the light source D65 for reflection or transmission levels, and 10° to the light source D65 for color indices (a* and b*). Unless otherwise specified, all refractive indices are measured at a wavelength of 550 nm.

Glazing containing a first sheet of 1.8 mm clear float glass and a second sheet of 1.4 mm clear float glass and having laminated with a 0.76 mm clear PVB sheet, was provided. As outlined in Tables in FIGS. 14 to 17, several first coatings were deposited on the 4th surface of the inner sheet of glass in a "high/low" sequence.

Next, the glazing was disposed in the path of the light emitted from the light source. The light source was constructed to emit normal light or p-polarized light. The performance of the glazing to the incident light is shown in Tables in FIGS. 14 to 17.

The optical parameters measured for the vehicle exterior surface reflection (Rv(out)) are as follows.

a) Light source A, 2°.

Tv=Transmission in the visible range.

Rv(out) (%)=reflection of the vehicle exterior surface in the visible range at a "standard" incident angle of 8°.

Rv(in) (%)=reflection of the vehicle interior surface in the visible range of unpolarized light at an incident angle close to the Brewster angle (57°). If the incident angle is referenced from the opposite side of the glazing (i.e. 180°-55°), then it will be referred to also as R125 (in).

Rp_pol (%)=reflection of the vehicle interior surface in the visible range of p-polarized light at an incident angle close to the Brewster angle (57°). If the incident angle is referenced from the opposite side of the glazing (i.e. 180°-55°), then it will be referred to also as Rp_pol125°.

R172 (in) (%)=reflection of the vehicle interior surface in the visible range at a standard incident angle of 8° (or 172° if the outer surface of the glazing is referred to).

b) Light source D65, 2°.

Tv=Transmission in the visible range.

c) Light source D65, 10°.

a*_Rout=color index of the vehicle exterior surface reflection at a*8°.

b*_Rout=color index of the vehicle exterior surface reflection at b*8°.

a*_Rin=a*R125=color index of the vehicle interior surface reflection at a*125°.

b*_Rin=b*R125=color index of the vehicle interior surface reflection at b*125°.

a*_Rp_pol=a*R125p_pol=color index of the vehicle interior surface reflection at 125° of a*p-polarized light.

b*_Rp_pol=b*R125p_pol=color index of the vehicle interior surface reflection at 125° of b*p-polarized light.

a*R172=color index of the vehicle interior surface reflection at a*172°.

b*R172=color index of the vehicle interior surface reflection at b*172°.

The results are generally as follows.

The transmittance of visible light was larger than 70%.

The vehicle exterior surface reflection was maintained at a moderate level with suitable reflective performance as indicated by the color indices at angles of 8° and 55°.

The optical properties of vehicle interior surface reflections such as Rp_pol at 55° incidence can be improved to from 13 to 14% level when 4 or more layers are provided, and the global vehicle interior surface reflection at 55° is maintained to be from 14 to 17%. The same is true for 57° incidence.

These results show the suitability of current vehicle glazing in HUD systems.

From the viewpoint of the angular dependence of color, the absolute value of a*_Rout-a*R55 is preferably at most 10. Similarly, the absolute value of b*_Rout-b*R55 is preferably at most 10.

Ex. 8-1 to 8-5 and Comparative Ex. 1

Glazing containing a first sheet of 1.8 mm clear float glass and a second sheet of 1.4 mm clear float glass was provided and laminated with a 0.76 mm clear PVB sheet. As shown in Tables in FIGS. 14 and 15, several coatings were deposited on the inner sheet of glass in a "high/low" sequence.

Ex. 8-1 to 8-3 and Comparative Ex. 1 had a high refractive index layer with the same optical thickness of 172.3 nm, and on the other hand, the low refractive index layer had the same optical thickness of 145.1 nm. Further, the geometric thickness and refractive index are outlined in Tables in FIGS. 14 and 15 with geometric thickness=optical thickness/refractive index.

Comparative Ex. 1 where the refractive index was based on titanium oxide with a refractive index being 2.35 (550 nm) had a p-polarized reflection of 10.2% at an incident angle of 55°. The same is true for 57° incidence.

Ex. 1 based on TZO having a refractive index of 2.33 (550 nm), had a p-polarized light reflection of 9.9% at an incident angle of 55°. In Ex. 2 using SiZrN, a p-polarized light reflection exceeding 7.0% at an incident angle of 55° was observed. Ex. 3 using ZSO5, had p-polarized light reflections exceeding 4.0% at an incident angle of 55°, respectively. The same is true for 57° incidence. All of them had satisfactory properties with respect to color indices.

The first coatings in Ex. 8-1 to 8-3 were able to withstand heat treatment and maintain their optical properties, while Comparative Ex. 1 was not able to withstand heat treatment.

Ex. 8-4 and 8-5

Glazing containing a first sheet of 1.8 mm clear float glass and a second sheet of 1.4 mm clear float glass was provided and laminated with a 0.76 mm clear PVB sheet. As outlined in Tables in FIGS. 16 and 17, several coatings were deposited on the inner sheet of glass in a "high refractive index film/low refractive index film" sequence.

The high refractive index layer of Ex. 8-4 was based on a sublayer of TZO and TSO. The high refractive index layer in Ex. 8-5 having two "high/low" sequences, was TZO or TSO.

The optical properties had satisfactory properties with respect to color indices. Ex. 8-4 had a p-polarized light reflection exceeding 9.0% at an incident angle of 55°.

Ex. 8-5 had a p-polarized light reflection of >12.0% at an incident angle of 55°.

Ex. 8-1 to 8-5 have the performance as described in Ex. 4 of FIG. 13.

In the foregoing, the preferred embodiments, etc., have been described in detail, but without being limited to the above-described embodiments, etc., various variations and substitutions can be made to the above-described embodiments, etc., without departing from the scope of the claims.

This application is a continuation of PCT Application No. PCT/JP2021/001091, filed on Jan. 14, 2021, which is based upon and claims the benefit of priority from Japanese Patent Application No. 2020-004523 filed on Jan. 15, 2020. The contents of those applications are incorporated herein by reference in their entireties.

REFERENCE SYMBOLS

1, 2: HUD system
10, 10A, 10B, 10C, 10D, 10E, 10F, 10G: Laminated glass
11, 11A, 12, 12A: Glass plate
13, 13A: Interlayer film
14: Shielding layer
15: p-Polarized light reflecting film
16: Adhesive layer
25: p-Polarized light reflecting coating
50: Light source
60: First optical system
70: Image display element
80: Second optical system
90: Concave mirror

What is claimed is:

1. A head-up display system for vehicles, which displays a virtual image on the vehicle exterior side of laminated glass, and which comprises laminated glass having a vehicle interior side surface and a vehicle exterior side surface, a light source that emits p-polarized visible light to the laminated glass, and a p-polarized light reflecting member provided at least in the region where the p-polarized visible light of the laminated glass is incident, wherein the incident angle of the p-polarized visible light to the vehicle interior side surface of the laminated glass is at least 42 deg and at most 72 deg, and the reflectance of the p-polarized visible light at an incident angle of the p-polarized visible light being 57 deg is at least 5%, the virtual image includes a main image which is observed with the highest luminance, and a subsidiary image which is observed with a lower luminance than the main image, among images that appear separated when the p-polarized visible light is incident on the laminated glass, the ratio of the reflectance of the subsidiary image to the reflectance of the main image is at most 30% within the entire range of the incident angle of the p-polarized visible light, and the p-polarized light reflecting member is a p-polarized light reflecting coating, the absolute value of a* Rout-a*R55 of the laminated glass is at most 10, and the absolute value of b* Rout-b*R55 of the laminated glass is at most 10, a* is a red/green coordinate, b* is a yellow/blue coordinate, a* Rout is a color index of the vehicle exterior surface reflection at a*8°, a*R55 is a color index of the vehicle exterior surface reflection at a*55°, b* Rout is a color index of the vehicle exterior surface reflection at b*8°, and b*R55 is a color index of the vehicle exterior surface reflection at b*55°.

2. The head-up display system according to claim 1, wherein the ratio of the reflectance of the subsidiary image to the reflectance of the main image is at most 25%.

3. The head-up display system according to claim 1, wherein the laminated glass has a reflectance of the p-polarized visible light of at least 10% at an incident angle of 57 deg.

4. The head-up display system according to claim 1, wherein the laminated glass has a reflectance of the p-polarized visible light of at most 25% at an incident angle of 57 deg.

5. The head-up display system according to claim 1, wherein the incident angle is at least 47 deg and at most 67 deg.

6. The head-up display system according to claim 1, wherein the p-polarized light reflecting member is disposed on the vehicle interior side surface of the laminated glass.

7. The head-up display system according to claim 1, wherein the head-up display system has a concave mirror disposed on the light path between the light source and the laminated glass, and the minimum radius of the concave mirror is at least 100 mm and at most 700 mm.

8. The head-up display system according to claim 7, wherein the distance from the center of the eye box to the focal point of the virtual image based on SAE J1757-2 (2018), is at least 3,000 mm.

9. The head-up display system according to claim 7, wherein the minimum radius of the concave mirror is at least 100 mm and at most 600 mm.

10. The head-up display system according to claim 1, wherein the laminated glass has a glass plate (vehicle interior side), a glass plate (vehicle exterior side) and an interlayer film, and the wedge angle of the glass plate (vehicle interior side) is larger than 0 mrad and at most 1.0 mrad, and the wedge angle of the interlayer film is larger than 0 mrad and at most 1.0 mrad.

11. The head-up display system according to claim 1, wherein the p-polarized light reflecting coating contains at least one high refractive index material layer and at least one low refractive index material layer.

12. The head-up display system according to claim 1, wherein the laminated glass has a vehicle interior side glass plate, a vehicle exterior side glass plate and an interlayer film that joins the vehicle interior side glass plate and the vehicle exterior side glass plate, in the laminated glass, at least one of the members located on the vehicle exterior side of the p-polarized light reflecting member, among the vehicle interior side glass plate, the vehicle exterior side glass plate, and the interlayer film, has a wedge-shaped cross-sectional area in which the thickness increases from the bottom side to the top side of the laminated glass in such a state that the laminated glass is mounted on the vehicle.

13. The head-up display system according to claim 12, wherein the p-polarized light reflecting member is disposed between the vehicle interior glass plate and the vehicle exterior glass plate in contact with the interlayer film, in the laminated glass, the vehicle interior side glass plate and/or the interlayer film located on the vehicle exterior side of the p-polarized light reflecting member, as well as the vehicle interior side glass plate and/or the interlayer film located on the vehicle interior side of the p-polarized light reflecting member, have a wedge-shaped cross-sectional area.

14. The head-up display system according to claim 12, wherein the p-polarized light reflecting member is disposed on the vehicle interior side of the vehicle interior side glass plate, in the laminated glass, at least one among the vehicle interior glass plate, the vehicle exterior glass plate, and the interlayer film, has a wedge-shaped cross-sectional area.

15. The head-up display system according to claim 12, wherein the sum of the wedge angles of the members located on the vehicle exterior side than the p-polarized light reflecting member, and/or the sum of the wedge angles of the members located on the vehicle interior side than the p-polarized light reflecting member, is larger than 0 mrad and at most 1.0 mrad.

16. The head-up display system according to claim 12, wherein the laminated glass has a plurality of members with the cross-sectional wedge shape, and the sum of the wedge angles of the plurality of members is at most 1.2 mrad.

17. The head-up display system according to claim 12, wherein the amount of separation between the main image and the subsidiary image is at most 1 mrad.

18. The head-up display system according to claim 1, wherein the laminated glass has a vehicle interior side glass plate, a vehicle exterior side glass plate, and an interlayer film that joins the vehicle interior side glass plate and the vehicle exterior side glass plate, and the thickness of the vehicle interior side glass plate is at most 1.8 mm.

19. The head-up display system according to claim 1, wherein the p-polarized light reflecting coating comprises at least one layer of a high refractive index material and at least one layer of a low refractive index material.

* * * * *